United States Patent
Drewes et al.

(10) Patent No.: US 11,902,899 B2
(45) Date of Patent: *Feb. 13, 2024

(54) RECEIVER WITH TUNABLE RECEIVING CHAIN

(71) Applicant: Apple Inc., Cupertino, CA (US)

(72) Inventors: Christian Drewes, Gernering (DE); Giuseppe Patane, Linz (AT); Thomas Mayer, Linz (AT); Christian Wicpalek, Puchenau (AT); Ram Kanumalli, Linz (AT); Burkhard Neurauter, Linz (AT)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,941

(22) Filed: Aug. 30, 2021

(65) Prior Publication Data

US 2021/0392585 A1    Dec. 16, 2021

Related U.S. Application Data

(63) Continuation of application No. 15/760,859, filed as application No. PCT/EP2016/069810 on Aug. 22, 2016, now Pat. No. 11,109,317.

(30) Foreign Application Priority Data

Sep. 23, 2015  (DE) .......................... 102015116071.4

(51) Int. Cl.
*H04W 52/02*     (2009.01)
*H04B 1/00*      (2006.01)
(Continued)

(52) U.S. Cl.
CPC ...... *H04W 52/0235* (2013.01); *H04B 1/0082* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,109,317 B2 * | 8/2021 | Drewes | H04W 72/042 |
| 2007/0160158 A1 * | 7/2007 | Zeng | H04L 5/023 375/260 |

(Continued)

FOREIGN PATENT DOCUMENTS

| | | |
|---|---|---|
| EP | 2117192 A1 | 11/2009 |
| WO | 2008044868 A1 | 4/2008 |

OTHER PUBLICATIONS

PCT International Search Report dated Oct. 14, 2016 for Application PCT/EP2016/069810; p. 1-4.

(Continued)

*Primary Examiner* — Clemence S Han
(74) *Attorney, Agent, or Firm* — Eschweiler & Potashnik, LLC

(57) ABSTRACT

A receiver includes a tunable receiving chain, configured to receive a subframe header when tuned to a first receiving bandwidth; a decoder, configured to decode an allocation information from the subframe header, the allocation information indicating an allocation of a plurality of resource blocks in the subframe; and a controller, configured to derive a second receiving bandwidth from the allocation information and to tune the receiving chain to the second receiving bandwidth.

18 Claims, 19 Drawing Sheets

(51) Int. Cl.
   *H04W 72/0446*   (2023.01)
   *H04W 72/23*   (2023.01)

(56) References Cited

U.S. PATENT DOCUMENTS

| | | | | | |
|---|---|---|---|---|---|
| 2010/0104001 | A1* | 4/2010 | Lee | .......................... | H04B 1/30 |
| | | | | | 375/240 |
| 2011/0134901 | A1* | 6/2011 | Hoshino | ............. | H04L 25/0232 |
| | | | | | 375/267 |
| 2011/0141996 | A1* | 6/2011 | Yamada | ............ | H04W 72/0453 |
| | | | | | 370/329 |
| 2012/0250653 | A1* | 10/2012 | Zhang | .................. | H04B 1/7143 |
| | | | | | 375/133 |
| 2013/0308728 | A1* | 11/2013 | Lindoff | ............... | H04L 27/2647 |
| | | | | | 375/316 |
| 2015/0201376 | A1* | 7/2015 | Webb | .................... | H04L 5/0048 |
| | | | | | 370/311 |

OTHER PUBLICATIONS

Notice of Allowance dated May 4, 2021 for U.S. Appl. No. 15/760,859.
Non-Final Office Action dated Oct. 15, 2020 for U.S. Appl. No. 15/760,859.

* cited by examiner

RECEIVER WITH TUNABLE RECEIVING CHAIN

This application is a Continuation Patent Application claiming priority to U.S. patent application Ser. No. 15/760,859 filed Mar. 16, 2018, which is a US National Phase Entry of International Patent Application No. PCT/EP2016/069810 filed Aug. 22, 2016, which claims priority to German Patent Application No. 102015116071.4 filed Sep. 23, 2015, and is hereby incorporated by reference in its entirety.

FIELD

The disclosure relates to a receiver with tunable receiving chain and a method for tuning a receiving chain of such a receiver in order to save power. In particular, the disclosure relates to a so called "breathing receiver" for low power operation in OFDMA-based receivers.

BACKGROUND

Power consumption is a crucial parameter for any User Equipment (UE). In a conventional radio communication system 100, e.g. as illustrated in FIG. 1 downlink transmission 101 from radio cell 110 to mobile station 120 may include information regarding power control of the mobile station. A power up command 102 may signal the mobile station 120 to change in normal power mode while a power down command 104 may signal the mobile station 120 to change in power saving mode.

Even when using power control, a significant amount of energy is still wasted in today's receiver analog and digital front ends. In OFDMA receiver systems with time-variant resource block allocation like, for example an LTE UE, only a less number of resource blocks may be allocated to the UE. When using hard power control techniques as illustrated in FIG. 1, the LTE receiver either receives all of the Physical Resource Blocks (PRBs) or is totally switched off when no resource block is allocated. Especially for the case of a small number of resource blocks being allocated to the UE, a significant amount of power is wasted.

There is a need to improve power saving performance in the mobile receiver.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
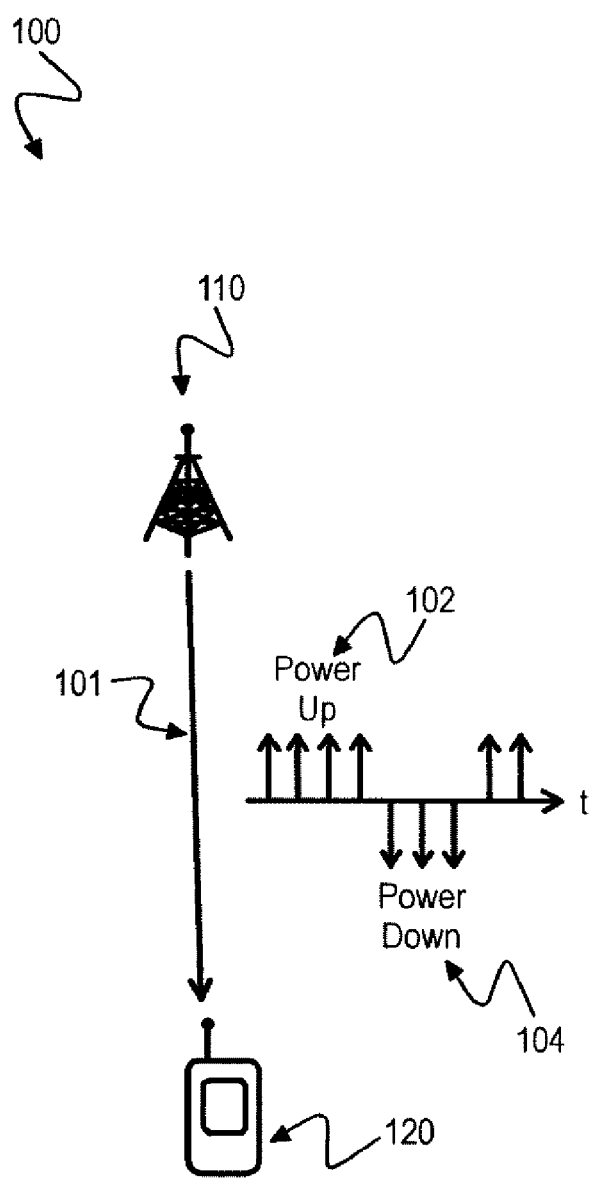
FIG. 1 is a schematic diagram illustrating a power saving technique in a conventional radio communication system 100.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
  CRS: Cell specific Reference Signal,
  RE: Resource Element,
  RB: Resource Block, e.g., a resource block in frequency direction times slot in time direction,
  PRB: Physical Resource Block,
  VRB: Virtualized Resource Block,
  3GPP: 3rd Generation Partnership Project,
  LTE: Long Term Evolution,
  LTE-A: LTE Advanced, Release 10 and higher versions of 3GPP LTE,
  RF: Radio Frequency, UE: User Equipment,
SINR: Signal-to-interference and noise ratio,
OFDM: Orthogonal Frequency Division Multiplex, eNB,
eNodeB: Base station,
(e)ICIC: (enhanced) Inter-Cell Interference Coordination,
MIMO: Multiple Input Multiple Output,
CE: Channel Estimation,
HARQ: Hybrid Automatic Repeat Request,
PDCCH: Physical Downlink Control Channel, ePDCCH,
EPDCCH: Enhanced Physical Downlink Control Channel,
DL: Downlink,
BW: Bandwidth,
PDSCH: Physical Downlink Shared Channel,
CA: Carrier aggregation,
UL: Uplink,
DL: Downlink,
MTC: Machine Type Communication.

The methods and devices described herein may be based on power saving and power saving circuits in mobile devices and radio receivers, in particular LTE radio receivers. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may be implemented in mobile devices (or mobile stations or User Equipments (UE), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes.

The methods and devices described hereinafter may be applied for interference cancellation (also relying on proper allocation to different UEs).

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency band. A diversity receiver uses two or more antennas to improve the quality and reliability of a wireless link.

The methods and devices described hereinafter may be based on receiving subframes, in particular subframes including a PDCCH channel or an EPDCCH channel. It is noted that if EPDCCH is used, the concept can be used only with inter-subframe allocation (that is when the allocation is sent within sub-frame N and the data is sent on sub-frame N+a, a being a suitable parameter). It is further noted that the ePDCCH with an intra subframe scheduling (not usable with breathing receiver) is standardized while the ePDCCH with an inter subframe scheduling (usable) is not standardized. The wording "First part of the subframe" or "Control region" well fits to an intra subframe allocation scheme because every subframe is self contained and there is no first, second subframes but parts of i. The wording "Header" is more general and does not necessarily apply only to a "sub-frame structured" communication protocol. In an intra sub-frame allocation scheme "Header" would be the control part (containing the PDCCH) of the same sub-frame. In an inter sub-frame allocation scheme "Header" would be the control part of sub-frame N, while data would be in sub-frame N+a. The reconfiguration, derived from the information contained in "Header" would occur at subframe N+a. For a=0, the intra-subframe allocation is included as well. In LTE release 8, all the (Layer 1) L1 control information is transmitted on the control region of subframes (i.e., first few OFDM symbols of each subframe). The PDCCHs are distributed across the full downlink bandwidth. In addition to the PDCCH of Release 8, the EPDCCH is available in Release 11. The EPDCCH uses PDSCH resources for control information transmission. It is UE-specific, meaning that different UEs can have different EPDCCH configurations. The EPDCCH is configured via RRC signaling. Each UE can be configured with two sets of EPDCCHs. The configuration can also be different between the two sets.

The methods and devices described hereinafter may apply carrier aggregation, inter subframe scheduling and inter subframe cross carrier scheduling. It is noted that inter subframe scheduling and cross carrier scheduling are different concepts as explained below in this paragraph. Carrier Aggregation is a feature of LTE Advanced. It enables an LTE-A UE to connect to several carriers simultaneously. It thus allows resource allocation across carriers and scheduler based fast switching between carriers without time consuming handover. In a HetNet scenario, for example, the available spectrum may be partitioned into e.g. two separate component carriers and the primary component carriers (PCC) may be assigned to different network layers. The primary component carrier is the cell that provides the control information to the UEs. By assigning this to different frequencies, interference on control channels like PDCCH, PHICH, PCFICH between network layers can be avoided. By means of so-called inter subframe cross-carrier scheduling, each network layer can still schedule UEs on other CCs called secondary component carriers (SCC). Cross carrier scheduling and inter sub-frame scheduling are two separated concepts generating different type of combinations. They are not tight together. Cross carrier scheduling is, as explained correctly, the possibility to schedule, via PCC, data addressed to that UE in multiple carriers. Inter sub-frame scheduling (not standardized yet) is the possibility to communicate, at subframe N, the allocation of data happening at sub-frame N+a. Inter subframe scheduling (with and without cross-carrier) is a proprietary proposal for Rel. 13. The breathing receiver can work (with different requirements and performance) with all of the 4 possible combinations, i.e. cross and non-cross carrier scheduling, inter and intra subframe allocation.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
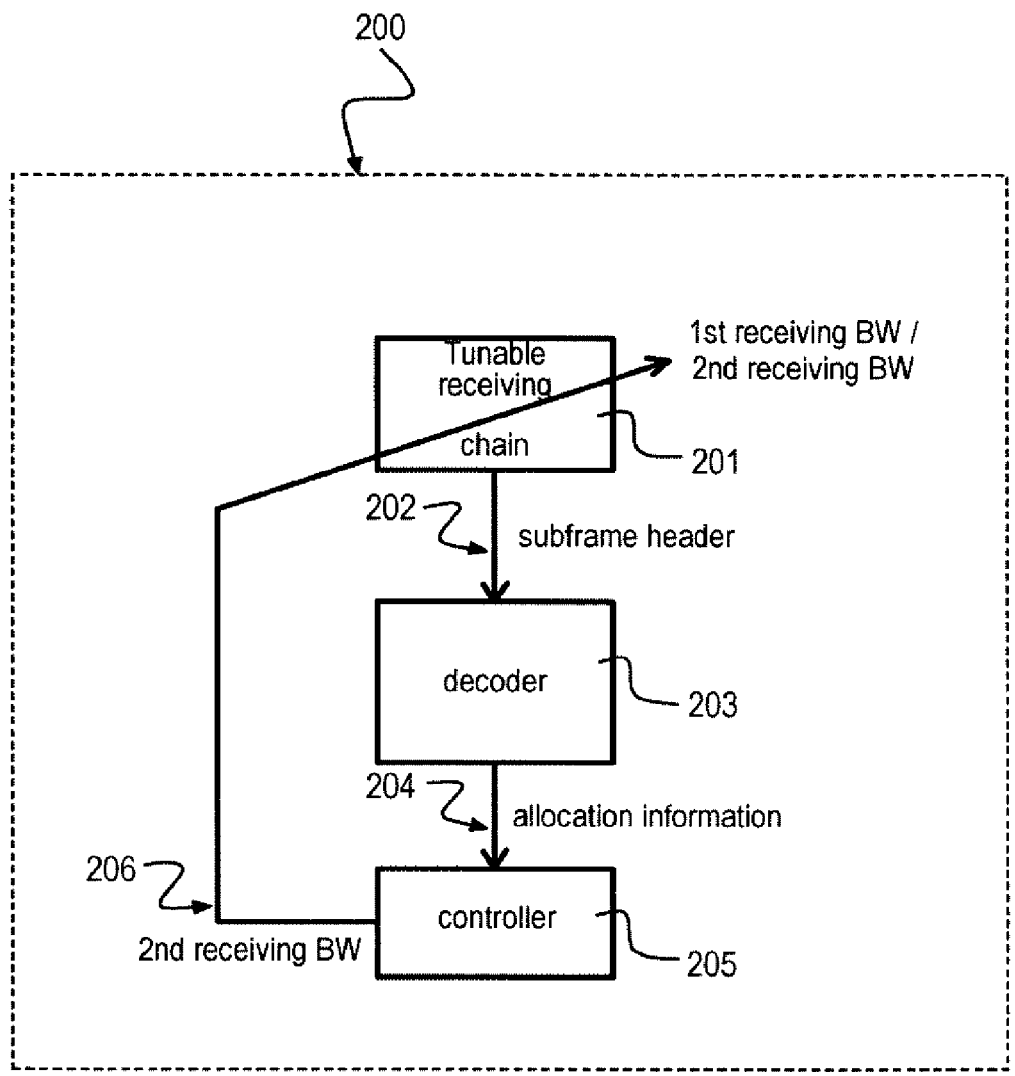
FIG. 2 is a block diagram illustrating a receiver 200 with tunable receiving chain according to the disclosure.

FIG. 2 is a block diagram illustrating a receiver 200 with tunable receiving chain according to the disclosure. The receiver 200 includes the tunable receiving chain 201, a decoder 203 and a controller 205.

The tunable receiving chain 201 receives a subframe header 202 when tuned to a first receiving bandwidth, e.g. a first receiving bandwidth 601 as described below with respect to FIGS. 6a to 6e. Subframe header may also be denoted as "first part of the subframe", "control region of the subframe" or simply "header". In the specific case of an LTE Rel. 8 "Header" may be translated as PDCCH region of the subframe. With the specific reference to FIGS. 6a to 6e when addressing "Intra sub-frame" scheduling, the subframe header relates to the first part of the subframe. The decoder 203 decodes allocation information 204 from the subframe header 202. The allocation information 204 indicates an allocation of a plurality of resource blocks in a first subframe, e.g. a subframe in which the subframe header is located. The controller 205 derives a second receiving bandwidth 206, e.g. a second receiving bandwidth 602 as described below with respect to FIGS. 6a to 6e, from the allocation information 204 and tunes the receiving chain 201 to the second receiving bandwidth 206, 602.

The subframe header 202 may include a PDCCH channel including a predetermined distribution of physical resource blocks (PRBs) as described below with respect to FIGS. 5a to 6e. The plurality of physical resource blocks may be contiguously distributed within a first subframe 600a, e.g. as shown by the X-marked blocks in FIG. 6a.

The second receiving bandwidth 206, 602 may be less than the first receiving bandwidth 601, e.g. as shown in FIGS. 6a to 6e. Due to the lesser second receiving bandwidth 602, a power consumption of the receiving chain 201 tuned to the second receiving bandwidth 206, 602 may be less than a power consumption of the receiving chain 201 tuned to the first receiving bandwidth 601.

The receiver 200 may include a frequency-tunable local oscillator coupled to the receiving chain 201. The controller 205 may tune the receiving chain 201 to the first receiving bandwidth 601 based on tuning the local oscillator to a first frequency 603 (see FIG. 6a) and may tune the receiving chain 201 to the second receiving bandwidth 206, 602 based on tuning the local oscillator to a second frequency 604 (see FIG. 6a).

The first frequency 603 may be a center frequency of the first receiving bandwidth 601 and the second frequency 604 may be a center frequency of the second receiving bandwidth 206, 602.

The tunable receiving chain 201 may include tunable analog and digital components which may be tuned to the first receiving bandwidth 601 for receiving the subframe header 202. The controller 205 may retune the analog and digital components to the second receiving bandwidth 206, 602 after the allocation information 204 has been decoded.

The controller 205 may tune the receiving chain 201 to the second receiving bandwidth 206, 602 if a difference between the first receiving bandwidth 601 and the second receiving bandwidth 206, 602 is above a threshold, e.g. depending on a degree of reduction in power consumption that can be achieved.

Figure 6A:
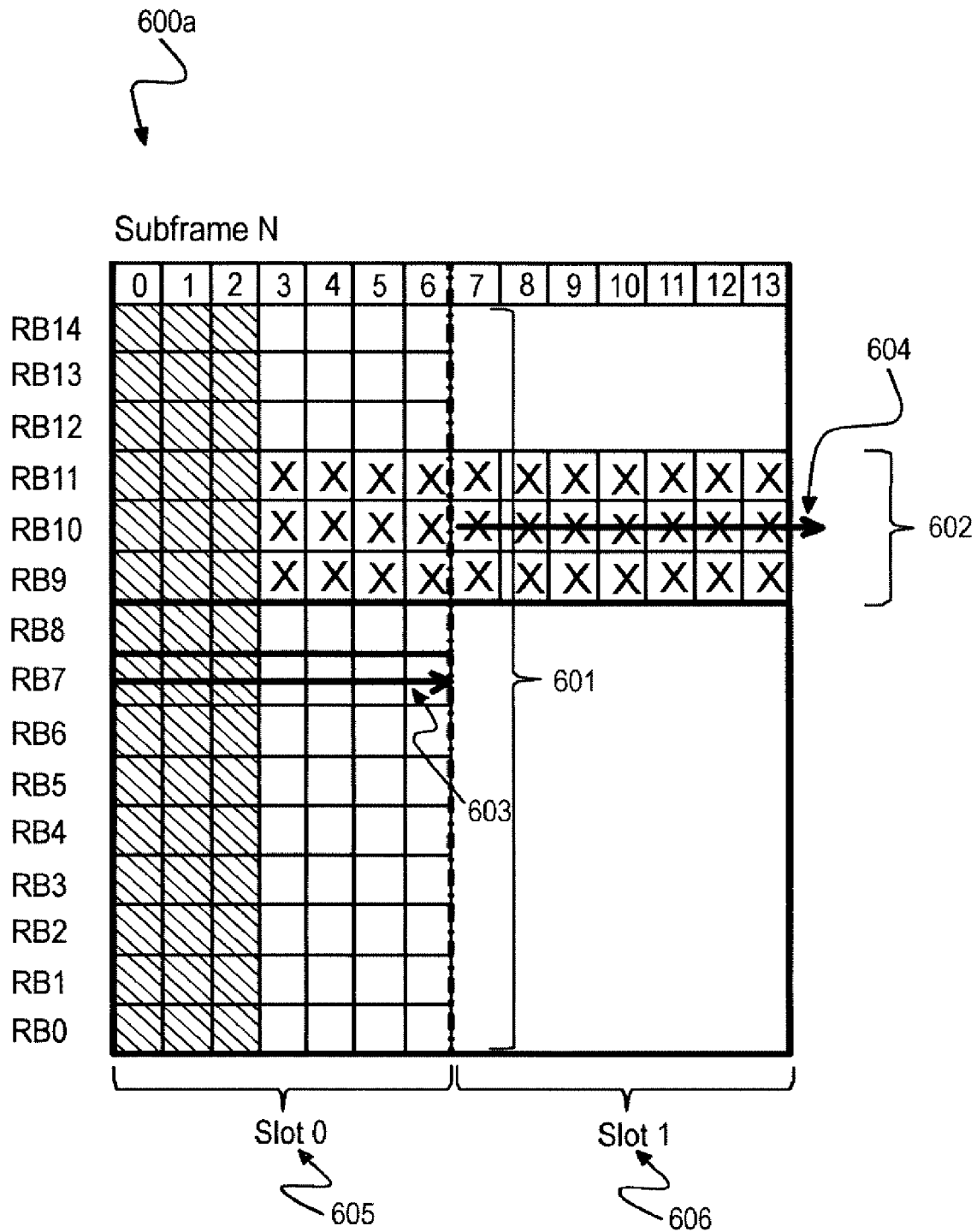
FIG. 6*a* schematically illustrates an exemplary tuning 600*a* of the receiving chain of the receiver 400, 200 when receiving the N-th subframe.
Figure 6B:
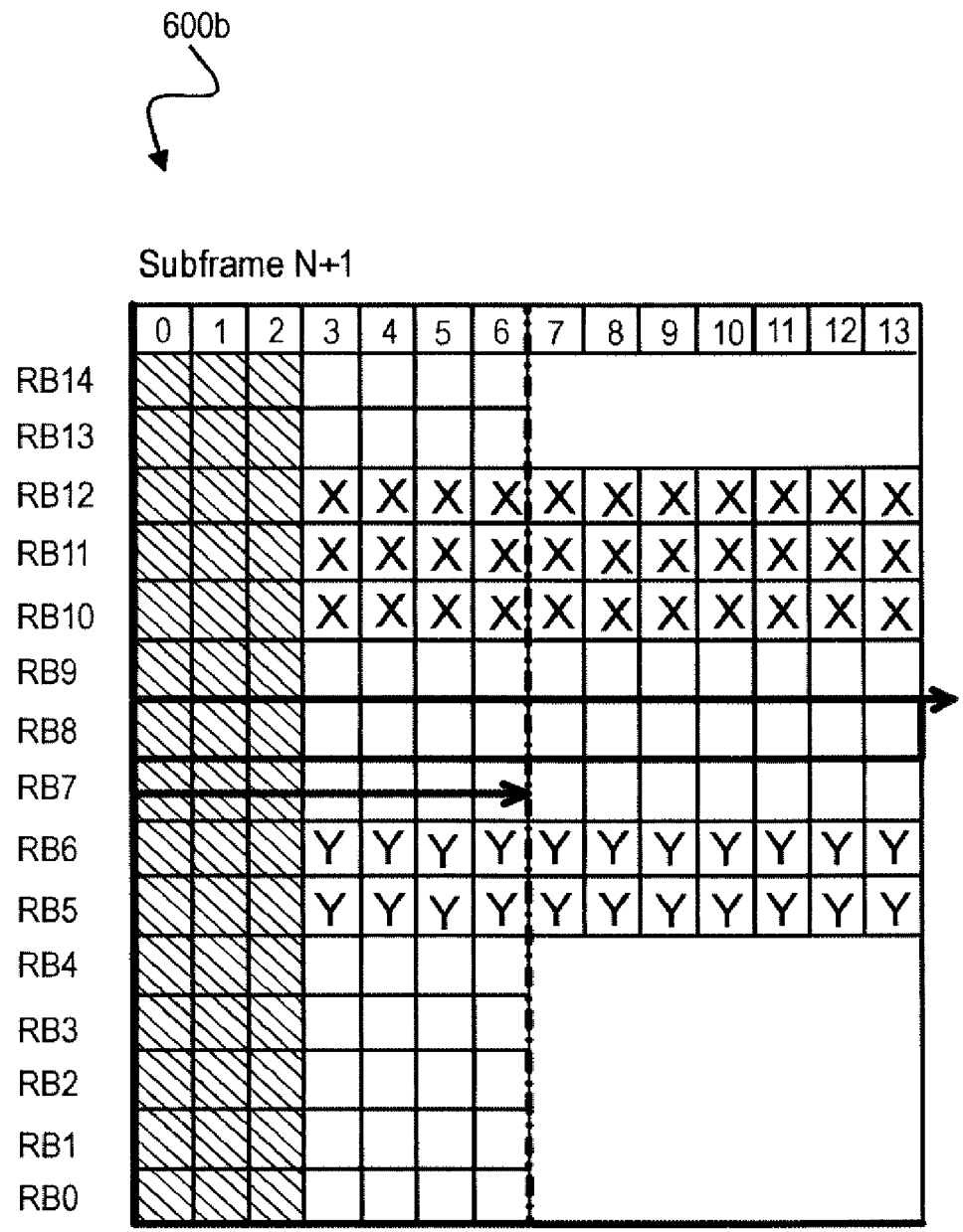
FIG. 6*b* schematically illustrates an exemplary tuning 600*b* of the receiving chain of the receiver 400, 200 when receiving the N+1-th subframe.
Figure 6C:
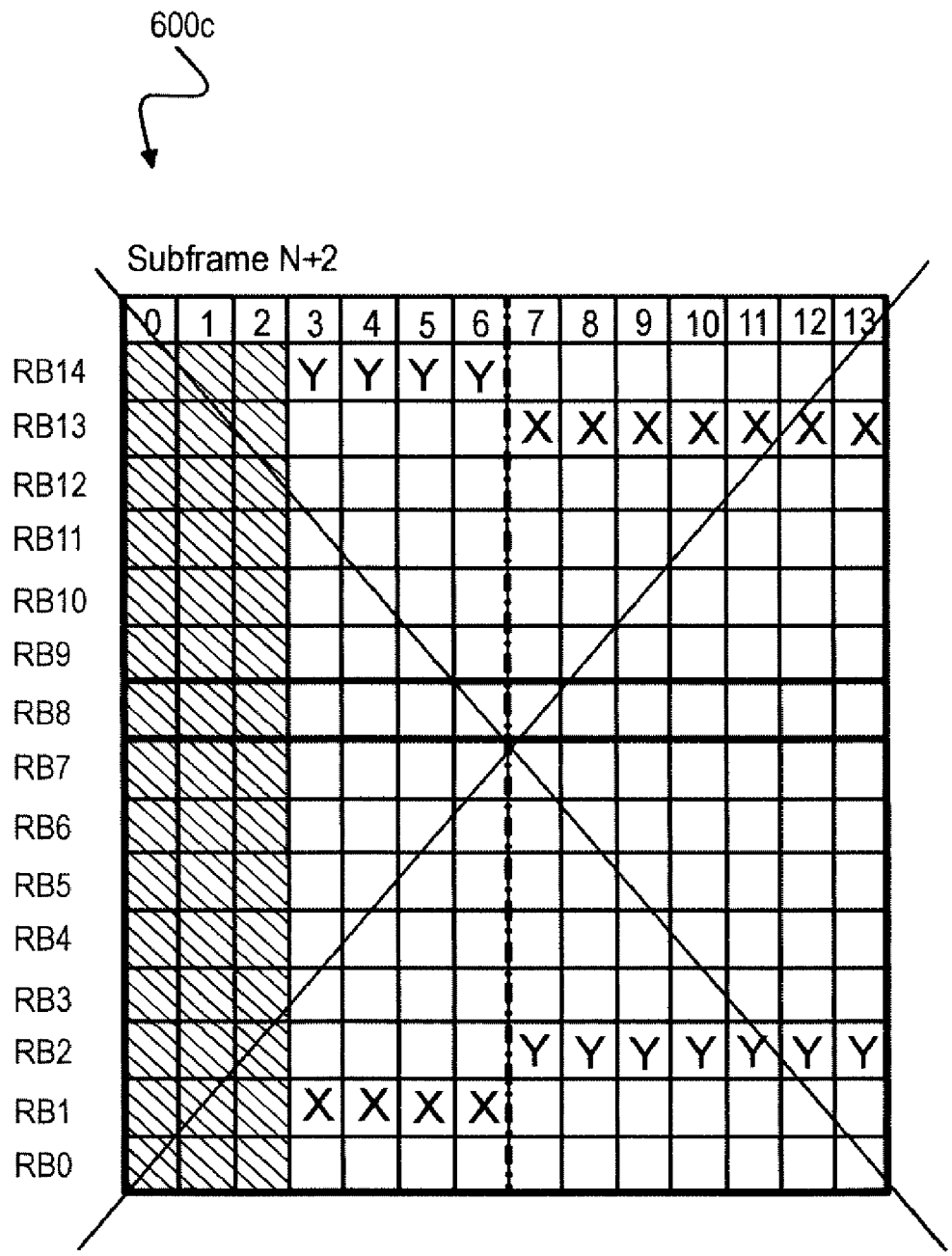
FIG. 6*c* schematically illustrates an exemplary behavior 600*c* of the receiving chain of the receiver 400, 200 when receiving the N+2-th subframe.
Figure 6D:
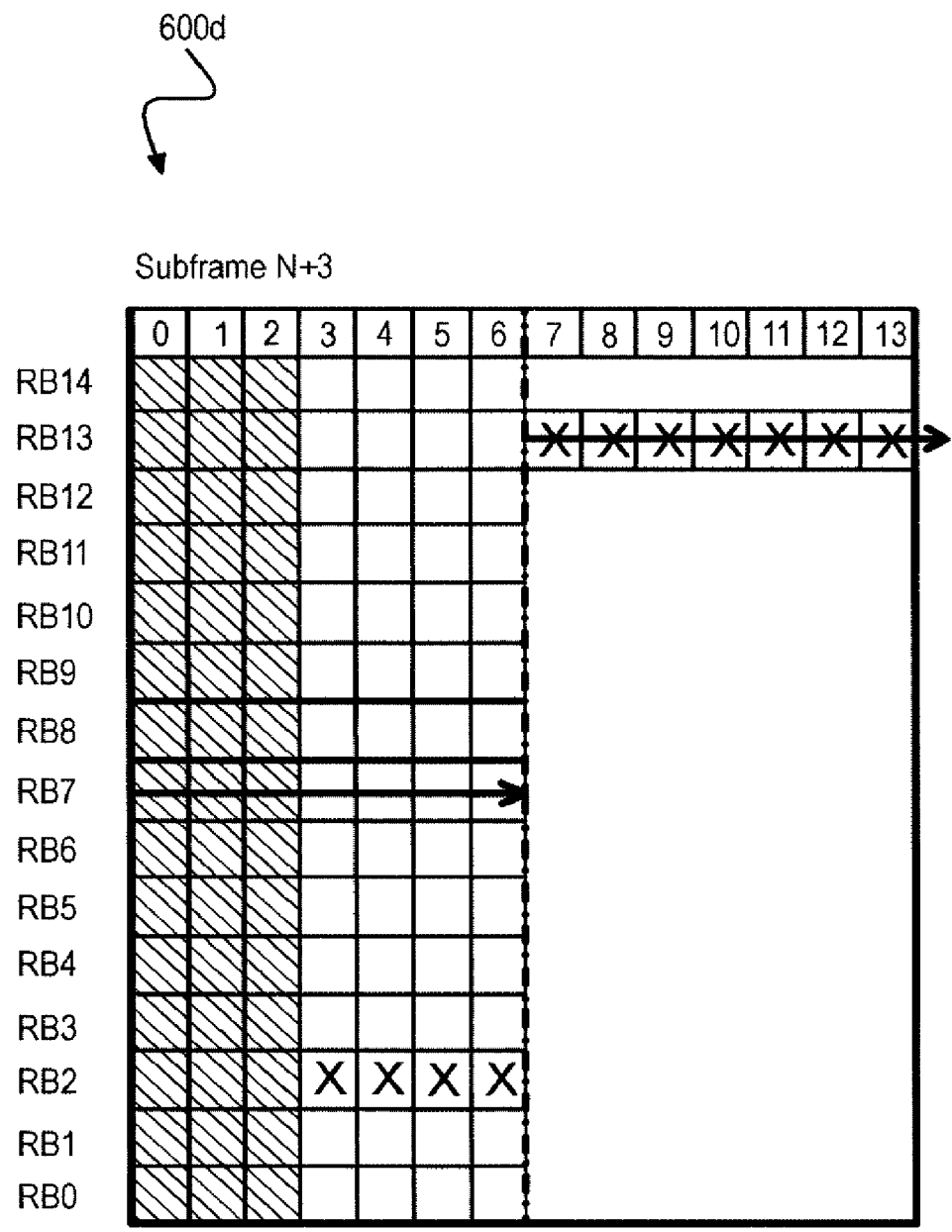
FIG. 6*d* schematically illustrates an exemplary tuning 600*d* of the receiving chain of the receiver 400, 200 when receiving the N+3-th subframe.

Each subframe may include a first slot 605 and a subsequent second slot 606 (see FIG. 6a). The decoder 203 may decode the allocation information 204 during the first slot 605.

The controller 205 may retune the receiving chain 201 to the first receiving bandwidth 601 after the slot border of the first subframe 600a has been received by the receiving chain 201 as further described below.

The controller 205 may tune the receiving chain 201 to the second receiving bandwidth 602 before the slot border of the first subframe 600a has been received by the receiving chain 201 as further described below.

The receiver 200 may include a phase estimator for estimating a phase of the subframe header 202, 700b based on reference symbols (R) of the first slot 705, e.g. as described below with respect to FIGS. 5a and 5b when the receiving chain 201 is tuned to the first receiving bandwidth 601. The phase estimator may re-estimate the phase based on reference symbols (R) of the second slot 706 (see FIG. 5b) when the receiving chain 201 is tuned to the second receiving bandwidth 602, e.g. as described below with respect to FIGS. 9a to 9d.

Figure 9A:
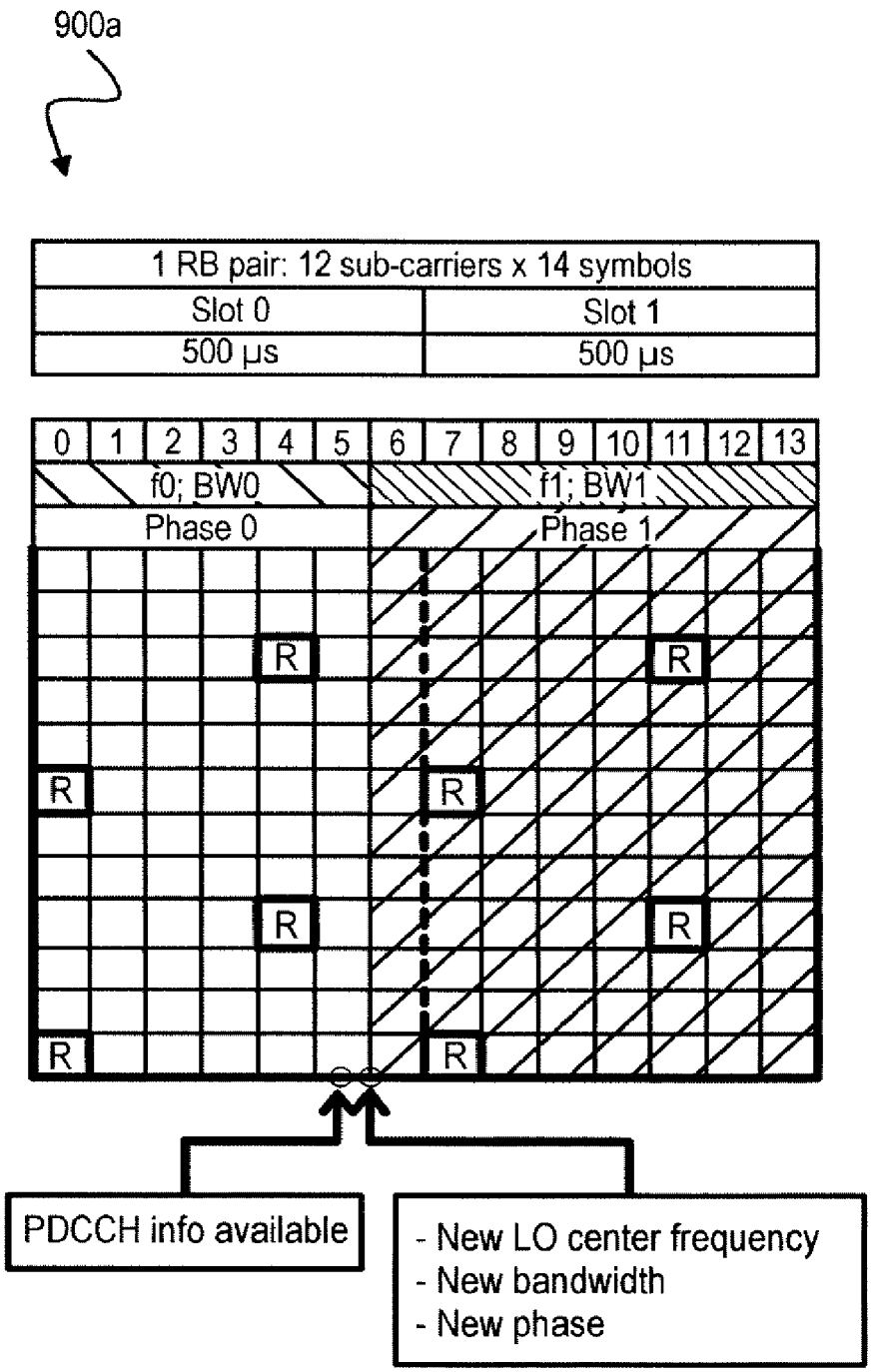
FIG. 9*a* depicts an exemplary LTE resource block pair 900*a* to illustrate decoding performance of a receiver 400, 200 which completes decoding during symbol 5 reception.
Figure 9B:
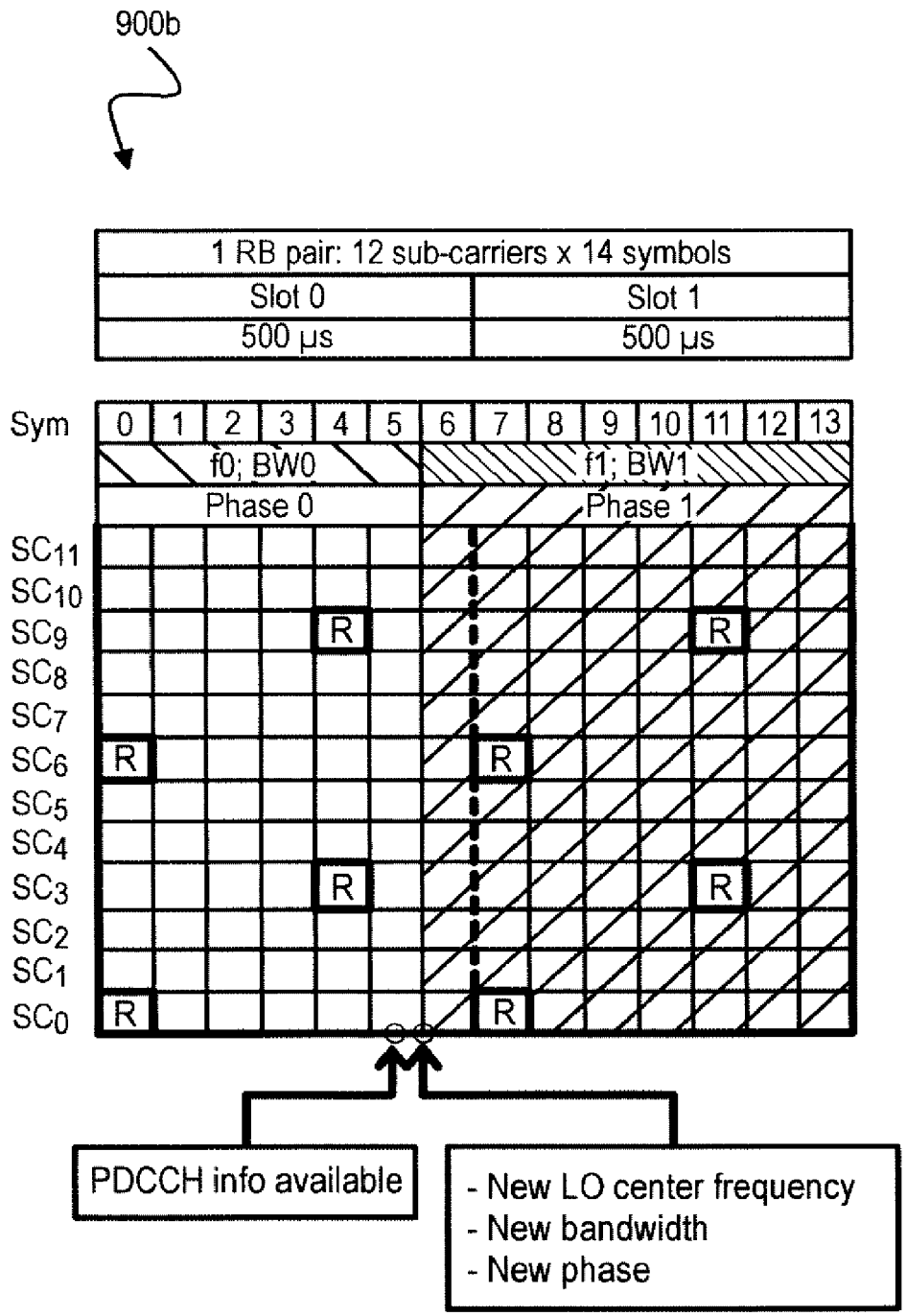
FIG. 9*b* depicts an exemplary LTE resource block pair 900*b* to illustrate decoding performance of a receiver 400, 200 which completes decoding during symbol 6 reception.

In the case that the allocation information has been decoded during the first slot, the controller 205 may tune the receiving chain 201 to the second receiving bandwidth 602 during the receiving of the second slot 606 of the first subframe 600a (see FIGS. 6a, 9a, 9b) by the receiving chain 201. It is noted that FIGS. 9a and 9b both refer to a case where the phase needs to be reestimated and the reestimation is done using the RS in the second slot. But FIG. 9a is related to the case of retuning the receiver already within the first slot while FIG. 9b is related to the case of retuning exactly at the border of the second slot.

Figure 9C:
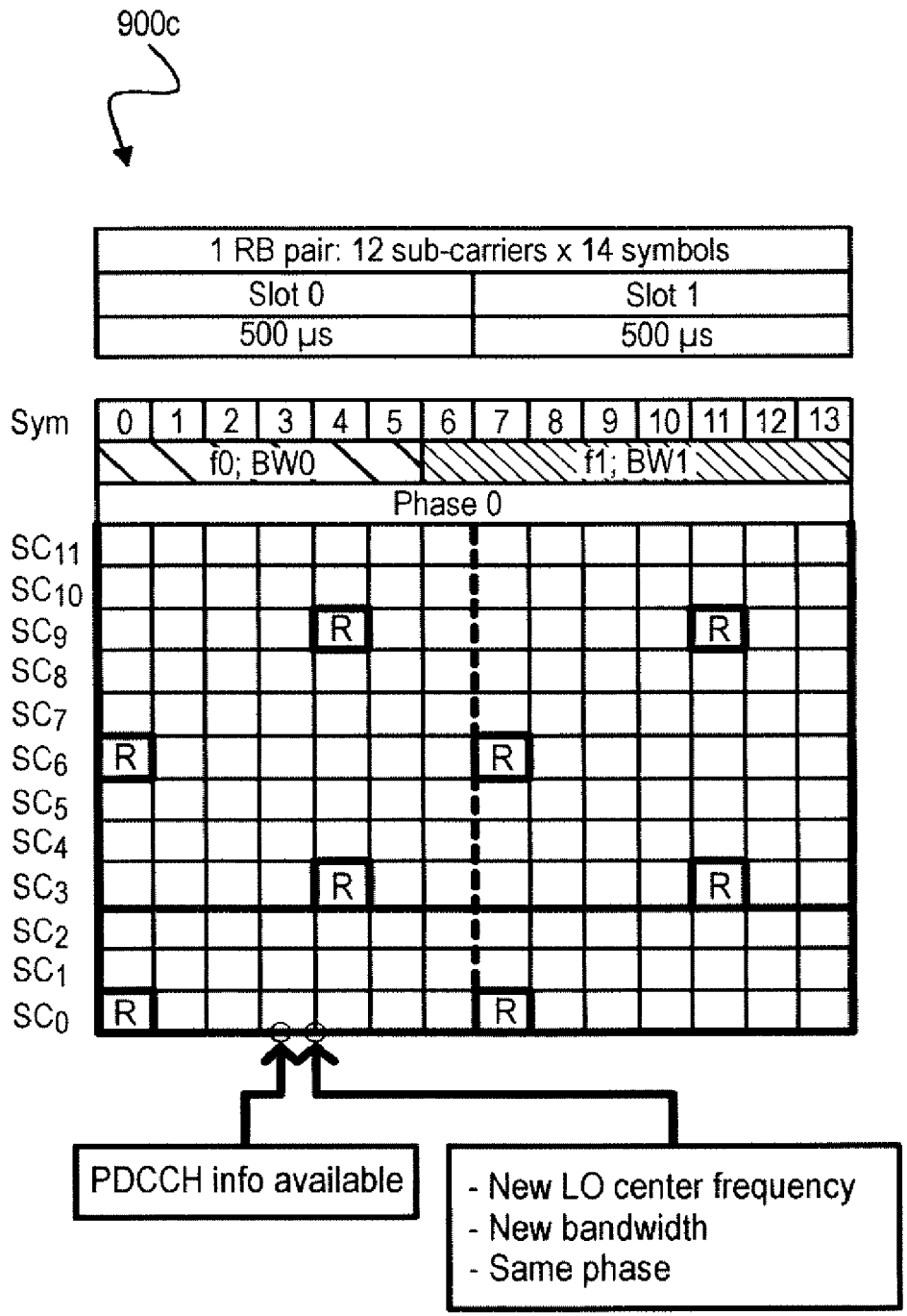
FIG. 9*c* depicts an exemplary LTE resource block pair 900*c* to illustrate fast PDCCH decoding.

Alternatively, the phase estimator may re-estimate the phase based on prior knowledge about a behavior of the phase when the receiving chain 201 is tuned to the second receiving bandwidth 602. Such a re-estimation based on prior knowledge may be, for example, performed in a case when the allocation information has not yet been decoded during the first slot, e.g. as described below with respect to FIGS. 9c and 9d. FIG. 9c refers to a case where the allocation information is decoded early during the first slot. It is noted that both FIG. 9c and FIG. 9d refer to the case where the phase is maintained.

The controller 205 may tune the receiving chain 201 to the second receiving bandwidth 602 responsive to the decoding of the allocation information 204 by the decoder 203, i.e. as soon as the allocation information 204 is available to the controller 205.

In a particular implementation, the controller 205 may tune the receiving chain 201 to the second receiving bandwidth 602 after the first subframe 600a has been received by the receiving chain 201, e.g. in the case when the allocation information has not yet been decoded during the first slot but decoded during the second slot, e.g. as described below with respect to FIG. 9d.

The receiving chain 201 may receive a plurality of subframes 600b, 600c, 600d, 600e following the first subframe 600a, e.g. as described below with respect to FIGS. 6a to 6e.

In one implementation, the receiver 200 may include a scheduling circuit for providing inter subframe scheduling information. This inter subframe scheduling information may indicate a scheduling of the plurality of subframes 600b, 600c, 600d, 600e and the first subframe 600a with respect to time. The controller 205 may tune the receiving chain 201 to the second receiving bandwidth 602 based on the inter subframe scheduling information.

The controller 205 may tune the receiving chain 201 to the second receiving bandwidth 602 after the receiving chain 201 has received a particular subframe of the plurality of subframes 600b, 600c, 600d, 600e. This particular subframe may be indicated by the inter subframe scheduling information.

In a further implementation, the scheduling circuit may provide inter subframe and/or cross carrier scheduling information. It is noted again that inter subframe information and cross carrier scheduling information are two different approaches that are independent from each other. Inter subframe or cross carrier scheduling information may indicate a scheduling of the plurality of subframes 600b, 600c, 600d, 600e including the first subframe 600a with respect to a plurality of carriers and time. The controller 205 may tune the receiving chain 201 to the second receiving bandwidth 602 based on the inter subframe and/or cross carrier scheduling information.

The second receiving bandwidth 602 may be associated with a particular carrier of the plurality of carriers. The controller 205 may tune the receiving chain 201 to the second receiving bandwidth 602 of the particular carrier. The particular carrier may be indicated by the inter subframe cross carrier scheduling information.

Figure 3:
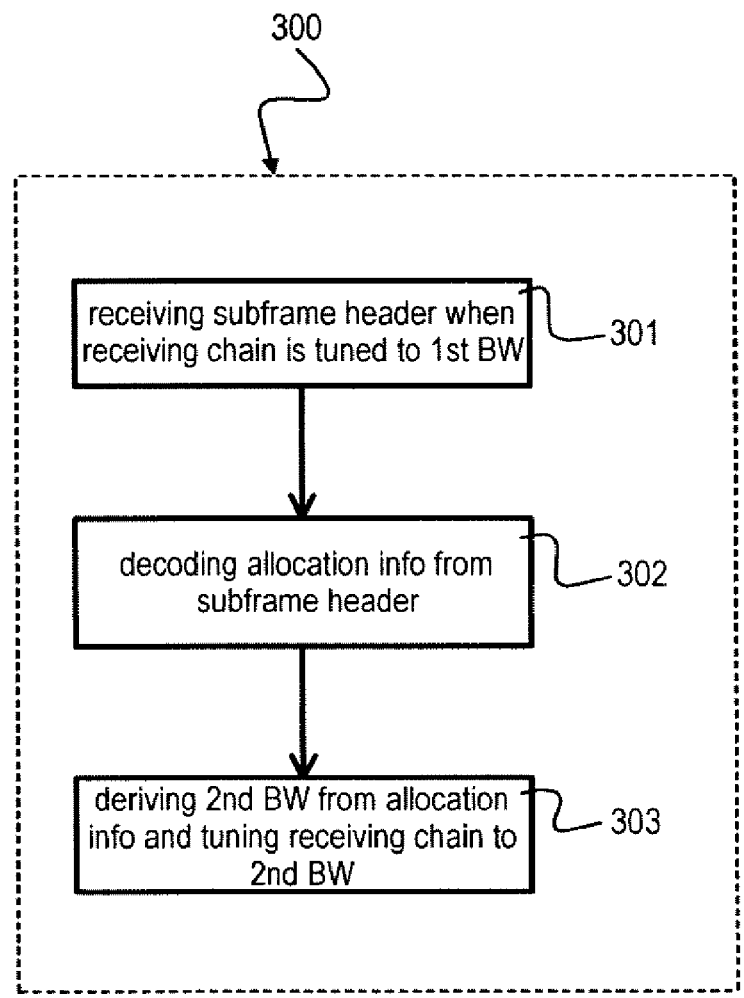
FIG. 3 schematically illustrates an exemplary method 300 for tuning a receiving chain for receiving a subframe header according to the disclosure.

FIG. 3 schematically illustrates an exemplary method 300 for tuning a receiving chain for receiving a subframe header according to the disclosure. The receiving chain may correspond to the receiving chain 201 of the receiver 200 described above with respect to FIG. 2.

The method 300 includes receiving 301 a subframe header, e.g. a subframe header 600a as described below with respect to FIGS. 6a to 6e, when the receiving chain is tuned to a first receiving bandwidth, e.g. a first receiving bandwidth 601 as described below with respect to FIGS. 6a to 6e.

The method 300 includes decoding 302 an allocation information from the subframe header. The allocation information indicates an allocation of a plurality of resource blocks in a first subframe, e.g. a first subframe including the subframe header.

The method 300 includes deriving 303 a second receiving bandwidth, e.g. a second receiving bandwidth 602 as described below with respect to FIGS. 6a to 6e, from the allocation information and tuning the receiving chain to the second receiving bandwidth.

Each subframe may include a first slot and a subsequent second slot. The tuning of the receiving chain to the second receiving bandwidth may be finished during the first slot.

The second receiving bandwidth may be less than the first receiving bandwidth.

Figure 4:
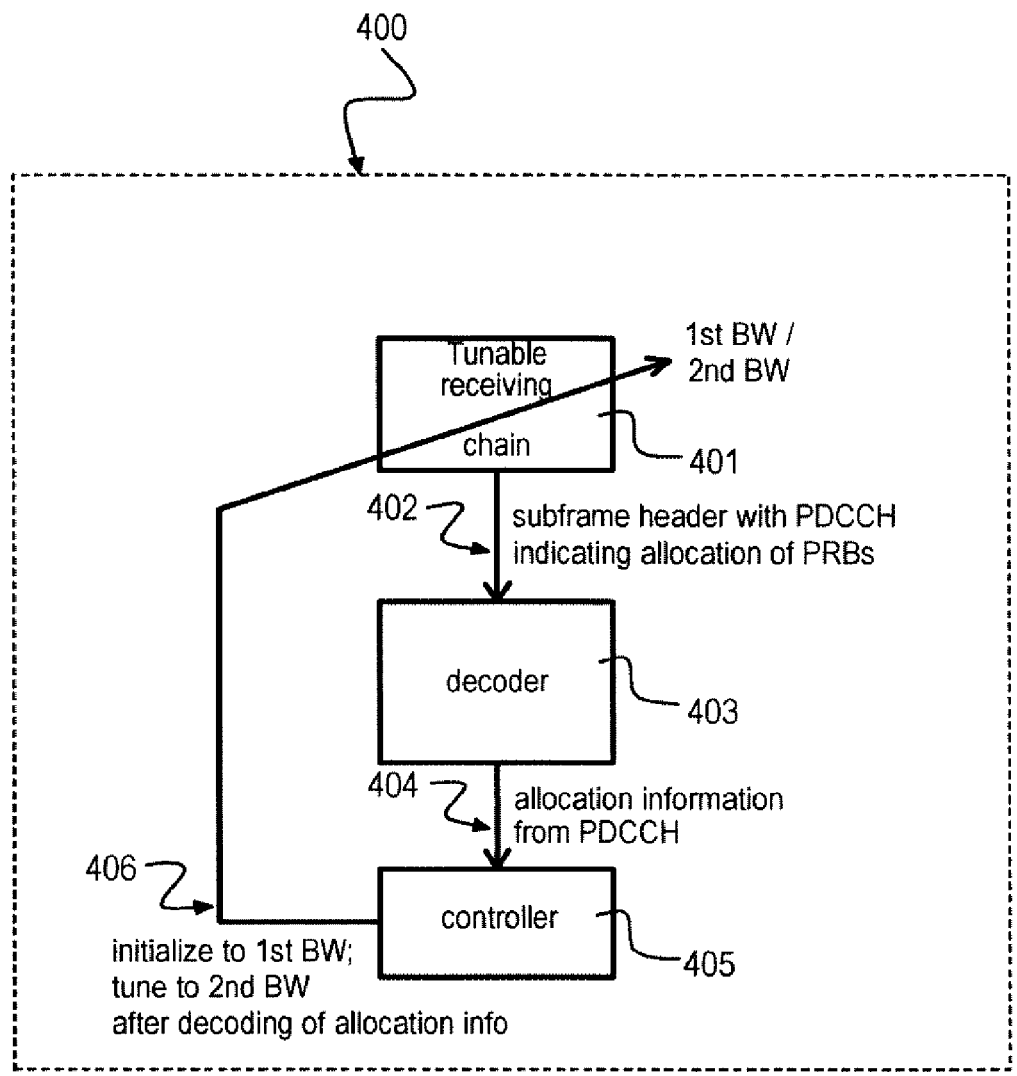
FIG. 4 is a block diagram illustrating a receiver 400 with tunable receiving chain for receiving a PDCCH channel according to the disclosure.

FIG. 4 is a block diagram illustrating a receiver 400 with tunable receiving chain for receiving a subframe header including a PDCCH channel according to the disclosure. The receiver 400 includes the tunable receiving chain 401, a decoder 403 and a controller 405.

The tunable receiving chain 401 receives a subframe header 402 when tuned 406 to a first receiving bandwidth, e.g. a first receiving bandwidth 601 as described below with respect to FIGS. 6a to 6e. The subframe header 402 includes a physical downlink control channel (PDCCH) with an allocation information 404 that indicates an allocation of a plurality of physical resource blocks (PRBs) transported by a first subframe.

The decoder 403 decodes the allocation information 404 from the physical downlink control channel (PDCCH). The controller 205 derives a second receiving bandwidth 602, e.g. a second receiving bandwidth 602 as described below with respect to FIGS. 6a to 6e, from the allocation information 404 and tunes 406 the receiving chain 401 to the second receiving bandwidth 602 after the allocation information 404 has been decoded.

The second receiving bandwidth 602 may be less than the first receiving bandwidth 601, e.g. as shown in FIGS. 6a to 6e. Due to the lesser second receiving bandwidth 602, a power consumption of the receiving chain 401 tuned to the second receiving bandwidth 602 may be less than a power consumption of the receiving chain 401 tuned to the first receiving bandwidth 601.

The receiver 400 may include a frequency-tunable local oscillator as described above with respect to FIG. 2. The tunable receiving chain 401 may include tunable analog and digital components as described above with respect to FIG. 2.

The plurality of physical resource blocks allocated for a certain UE may be contiguously distributed within the first subframe 402, 600a, e.g. as shown by the X-marked blocks in FIG. 6a.

Figure 5A:
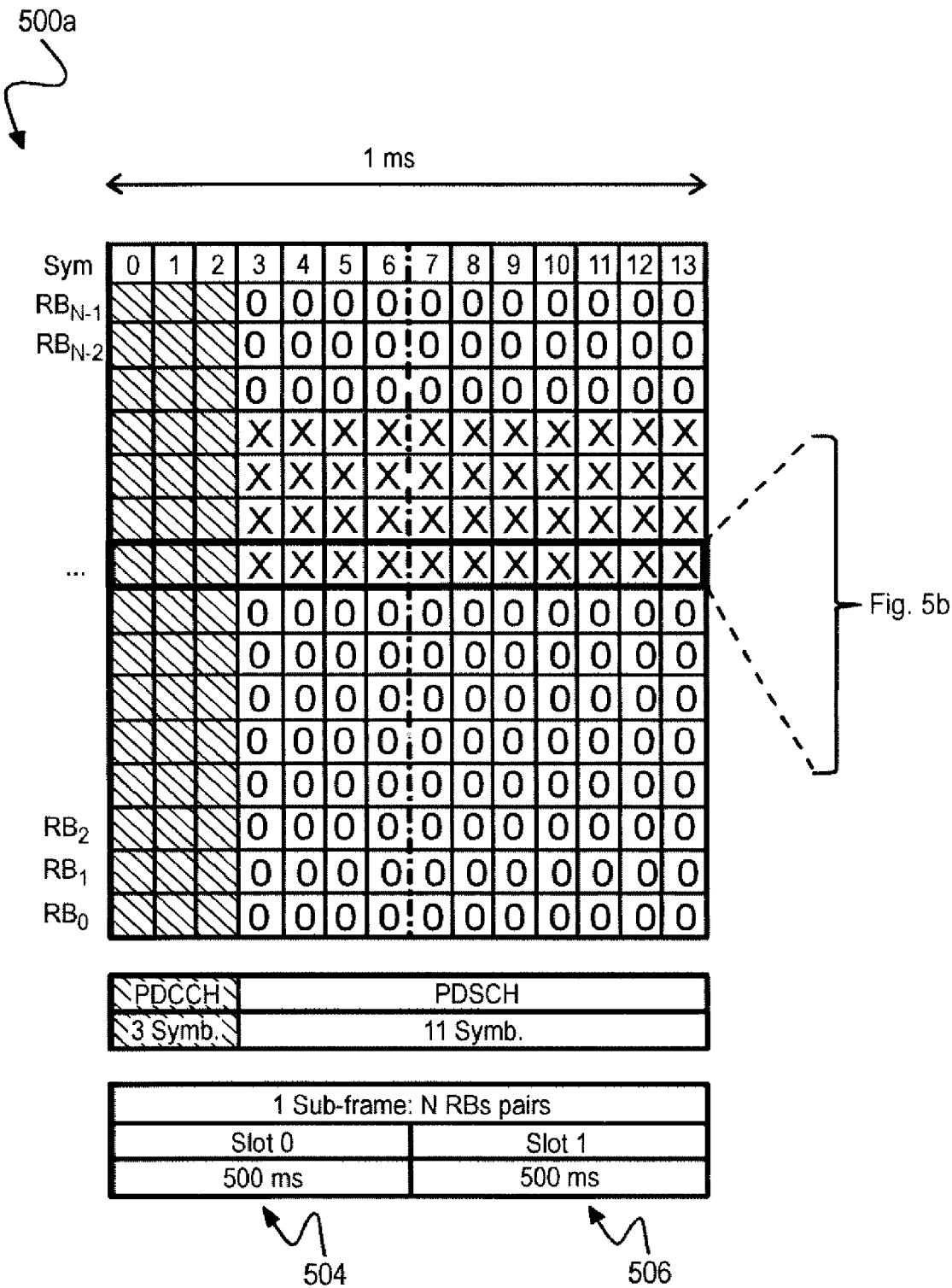
FIG. 5*a* schematically illustrates an exemplary LTE subframe 500*a* that may be received by the receiver 400 of FIG. 4.
Figure 5B:
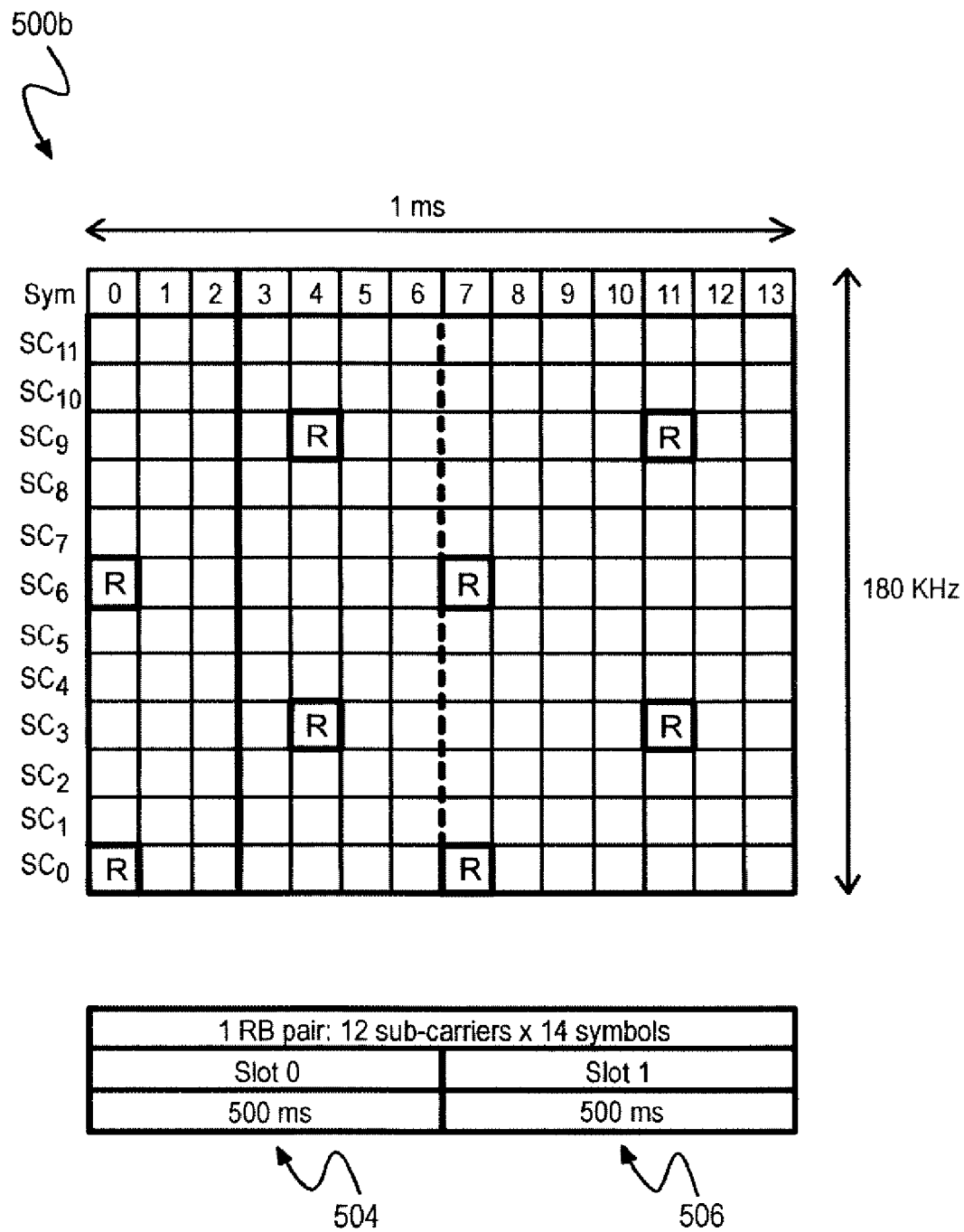
FIG. 5*b* schematically illustrates an exemplary LTE resource block pair 500*b* that may be received by the receiver 400 of FIG. 4 within the LTE subframe 500*a* depicted in FIG. 7*a*.

FIG. 5a schematically illustrates an exemplary LTE subframe 500a that may be received by the receiver 400 of FIG. 4 or the receiver 200 of FIG. 2. FIG. 5b schematically illustrates an exemplary LTE resource block pair 500b that may be received by the receiver 400 of FIG. 4 within the LTE subframe 500a depicted in FIG. 7a. Note that FIG. 5b illustrates a configuration with 3 symbols used for PDCCH; alternatively a (not shown) configuration where up to 4 symbols can be allocated to PDCCH which is valid for LTE 1.4 MHz can be applied as well.

The subframe 500a includes a plurality of resource block pairs $RB_0, RB_1, \ldots, RB_{N-1}$. An example of a resource block pair 500b is depicted in FIG. 5b. Each subframe 500a includes a control region PDCCH having a length of 3 symbols, for example and a data region PDSCH having a length of 11 symbols, for example. In LTE one subframe 500*a* has a duration of 1 ms that is partitioned into a first slot 505 and a second slot 506 each having a length of 500 ms. In LTE, the resource block pair 500*b* may include twelve subcarriers times fourteen symbols corresponding to a bandwidth of 180 kHz at a duration of 1 ms. A plurality of such subframe pairs 500*b* with respect to frequency are forming the subframe 500*a* depicted in FIG. 5*a*.

The subframe 500*a* may be partially filled with data for a specific UE as shown by the X-marked areas. The sub-frame is normally full with data for the UE that we are considering and with data for other UEs. The X-marked areas refer to the data allocated to "our" UE. The 0-marked areas illustrate the power saving potential that may be achieved when using the receiver 200, 400 described above with respect to FIGS. 2 and 4 or the method 300 as described above with respect to FIG. 3.

Figure 6E:
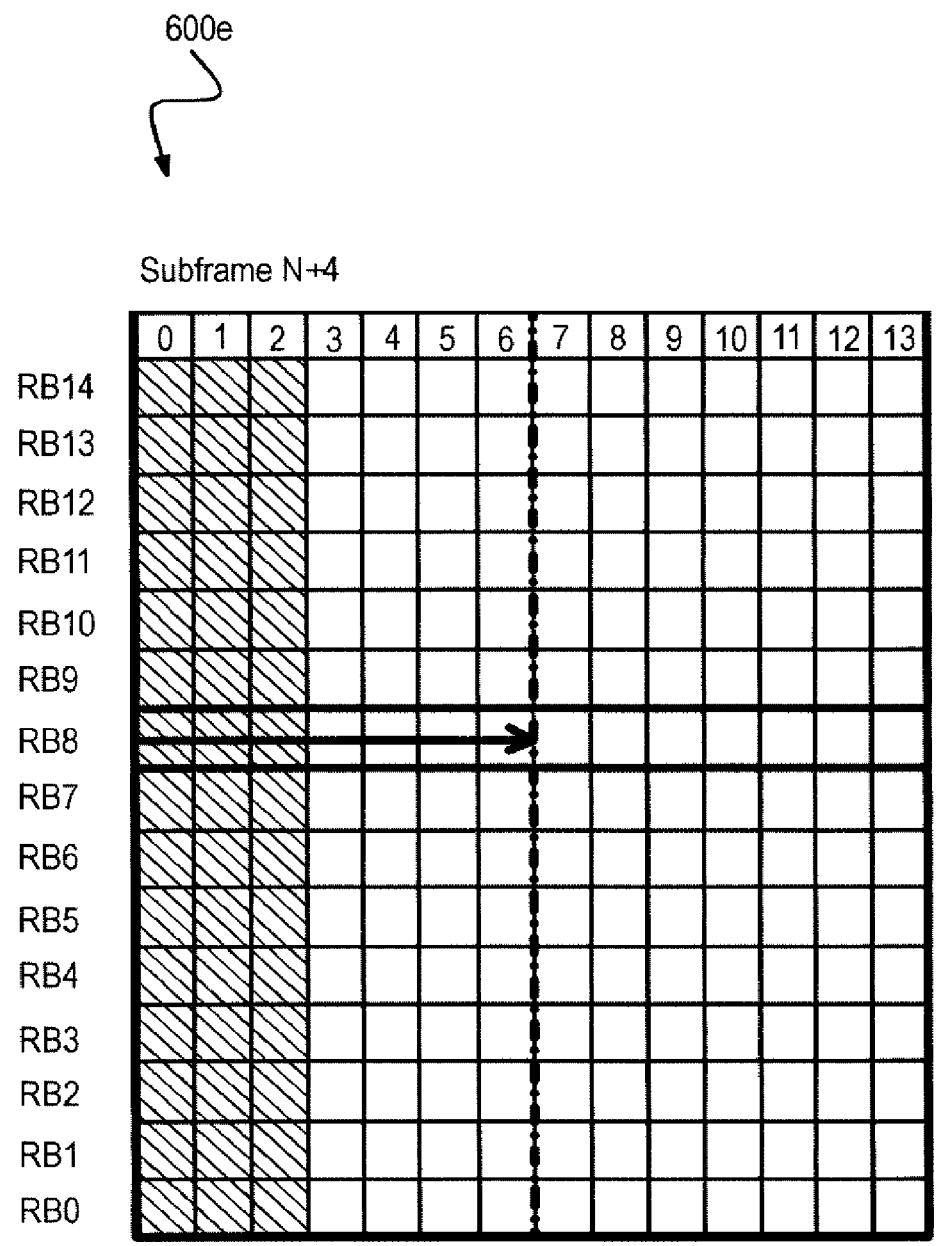
FIG. 6*e* schematically illustrates an exemplary behavior 600*e* of the receiving chain of the receiver 400, 200 when receiving the N+4-th subframe.

FIGS. 6*a* to 6*e* schematically illustrate an exemplary tuning of the receiving chain of the receiver 400, 200 when receiving the N-th subframe (FIG. 6*a*), the N+1-th subframe (FIG. 6*b*), the N+2-th subframe (FIG. 6*c*), the N+3-th subframe (FIG. 6*d*) and the N+4-th subframe (FIG. 6*e*).

In FIG. 6*a*, only the X-marked area contains data for "our" UE. A tunable receiving chain 201, 402 according to FIG. 2 and FIG. 4 may receive the N-th subframe 600*a* when tuned to a first receiving bandwidth 601. The subframe header of the N-th subframe 600*a* may correspond to the subframe header as received by the receiver 200, 400. This subframe header of the N-th subframe 600*a* includes a physical downlink control channel (PDCCH) in the first three symbols of the first slot 605. The decoder 203, 403 may decode the allocation information that indicates an allocation of a plurality of physical resource blocks (PRBs), i.e. the X-marked areas, transported by the N-th subframe 600*a*.

The controller 205, 405 may then derive a second receiving bandwidth 602 from the allocation information and may tune the receiving chain 201, 401 to the second receiving bandwidth 602 after the allocation information has been decoded.

A frequency-tunable local oscillator coupled to the receiving chain 201, 401 may be used to tune the receiving chain 201, 401. The controller 205, 405 may tune the receiving chain 201, 401 to the first receiving bandwidth 601 by tuning the local oscillator to a first frequency 603, e.g. a center frequency of the first receiving bandwidth 601, and may tune the receiving chain 201, 401 to the second receiving bandwidth 602 by tuning the local oscillator to a second frequency 604, e.g. a center frequency of the second receiving bandwidth 602.

FIG. 6*a* shows a contiguous allocation of PRBs within the subframe N 600*a* while FIGS. 6*b* to 6*e* shows non-contiguous allocations of PRBs, different sections marked as X section and Y section are allocated with the subframes N+1 600*b* and N+2 600*c*.

FIGS. 6*a* to 6*e* illustrate a (non-exhaustive) list of possible downlink PRB allocation for an exemplary "3GPP Rel. 8-like" LTE UE. In each LTE sub-frame (1 ms overall, made of 14 OFDM symbols), up to the first three (four for LTE 1.4) symbols may contain, together with reference symbols, control information (PCFICH and PDCCH), part of which is related to the downlink PRB allocation for the same subframe.

At sub-frame N 600*a* there is a cluster of contiguous PRBs (X-marked area) allocated for the UE (Localized Type 2 Allocation). At sub-frame N+1 600*b* there are two clusters of contiguous PRBs (X-marked area and Y-marked area) allocated for the UE (Type 0 allocation). At sub-frame N+2 multiple PRBs (X-marked areas and Y-marked areas) are allocated over the full bandwidth with additional frequency hopping between the two slots 605, 606 of the sub-frame (Distributed Type 2 allocation). Please, note that the exact position of the RB is specified by an algorithm. The positions in the picture have been arbitrarily picked for showing the concept but have not been calculated using the correct algorithm. At sub-frame N+3 600*d* the same allocation as for sub-frame N+2 600*c* (Distribute Type 2) is used but with only one PRB (X-marked area), hopping between the two slots 605, 606. At sub-frame N+4 600*e*, no PRB is allocated for the UE. In the same way as noted above, the exact position of the RB is specified by an algorithm. The positions in the picture have been arbitrarily picked for showing the concept but have not been calculated using the correct algorithm.

FIGS. 6*a* to 6*e* illustrate the basic idea of a breathing receiver according to the disclosure, that is, a receiver 200 as described above with respect to FIG. 2 or a receiver 400 as described above with respect to FIG. 4. In practice, a small portion of the whole bandwidth (a few PRB in LTE) may be scheduled for "our" UE on a certain sub-frame. A receiver according to the disclosure receives and processes not the entire bandwidth which would waste a lot of power. Instead, the receiver according to the disclosure selects the relevant portion out of the entire received bandwidth which results in significant amount of power saving. That means, only the allocated data (RBs) is selected, received and processed for that UE at earliest possible stage in the receiver chain thus maximizing the power saving. The basic principle of the breathing receiver can be described as follows: at each sub-frame, the control part is received and decoded; as soon as the information on the PDCCH is decoded, the UE knows which PRB are allocated to it and "reconfigures", "if convenient", the receiver to receive only such PRB.

"Reconfigures" means that the receiver will consider only the "relevant bandwidth", that is the portion of the total bandwidth containing all of the PRBs to it allocated, including the non-allocated PRBs in between extremes (for example, the relevant bandwidth is RB9-RB11 for subframe N 600*a*, it is RB5-RB12 for sub-frame N+1 600*b*).

"If convenient" means that the receiver will perform the reconfiguration only if the "relevant bandwidth" is significantly reduced compared to the full bandwidth (with reference to FIGS. 6*a* to 6*e*, sub-frame N+2 600*c* is a sub-frame where the reconfiguration is not convenient.

The breathing receiver may switch the local oscillator to the central frequency of the "relevant bandwidth", reconfigure its components in the analog domain and the signal processing chain in the digital domain (sampling frequency, FFT sizes and so on) to fit only the "relevant bandwidth". By reducing already at the first stage of the receiving chain the amount of data received and processed, the consumption of the breathing receiver is scaling with the "relevant bandwidth". The effectiveness of the breathing receiver is highly dependent on the resources allocation, i.e. the "relevant bandwidth".

Figure 7A:
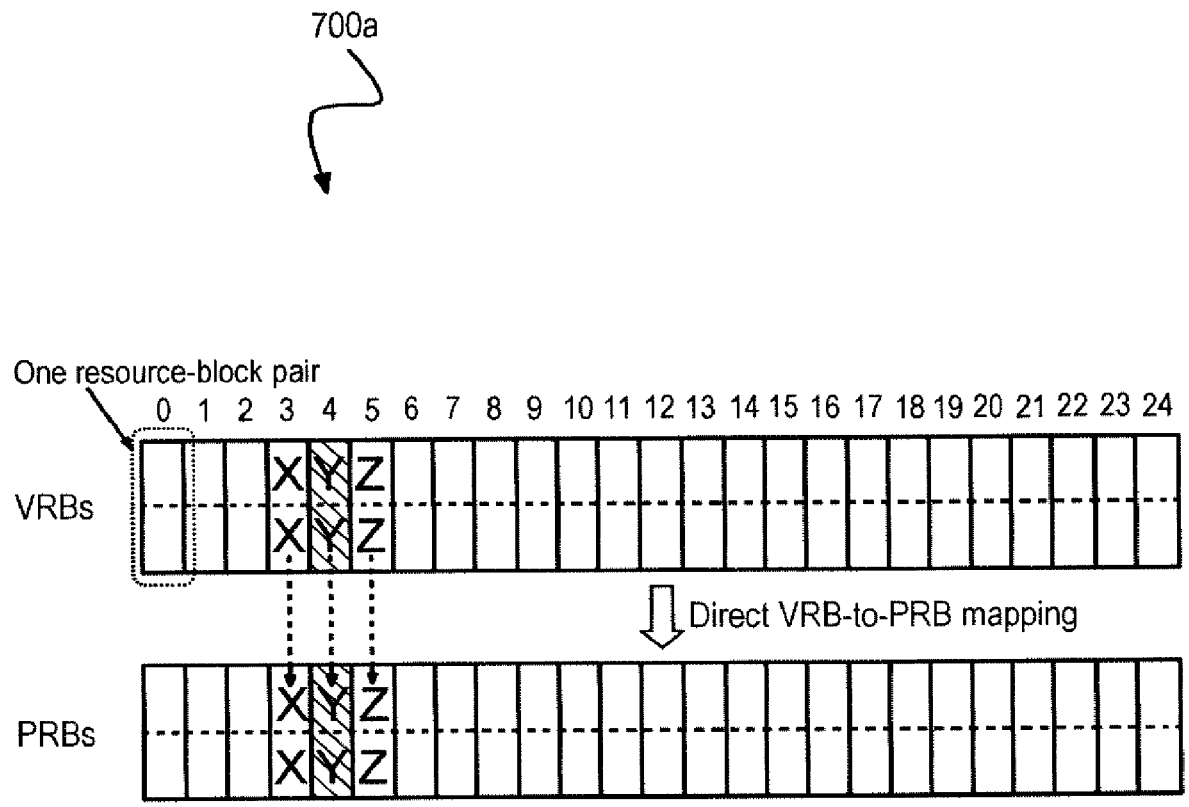
FIG. 7*a* schematically illustrates an exemplary VRB (virtualized resource block) to PRB (physical resource block) mapping 700*a* in the case of localized VRBs.

FIG. 7*a* schematically illustrates an exemplary VRB (virtualized resource block) to PRB (physical resource block) mapping 700*a* in the case of localized VRBs.

The base station may allocate resource blocks according to different "types", such as for example Type 0, Type 1 and Type 2. Type 2 allocation with localized allocation is the most favorable to the breathing receiver. In type 2 allocation, all of the blocks allocated by the base station (eNodeB in the LTE naming) can be contiguous.

All of the allocation information such as allocation type (0, 1, 2), localized versus distributed allocation may be included in the PDCCH of the current sub-frame.

FIG. 7a illustrates allocation with localized Virtual Resource Blocks according to 3GPP naming. The base station may allocate Virtual Resource Blocks (VRBs) for each user. Afterwards, the VRBs may be mapped to Physical Resource Blocks (PRBs) (what is really being transmitted in the air). Type 2 allocation always assigns contiguous VRBs but, mapping to PRBs can be different. FIG. 7a illustrates the case where the contiguous VRBs are mapped to contiguous PRBs. For example contiguous VRBs X in resource block pair 3 are mapped to contiguous PRBs X in resource block pair 3. This mapping represents the best condition for the breathing receiver.

Figure 7B:
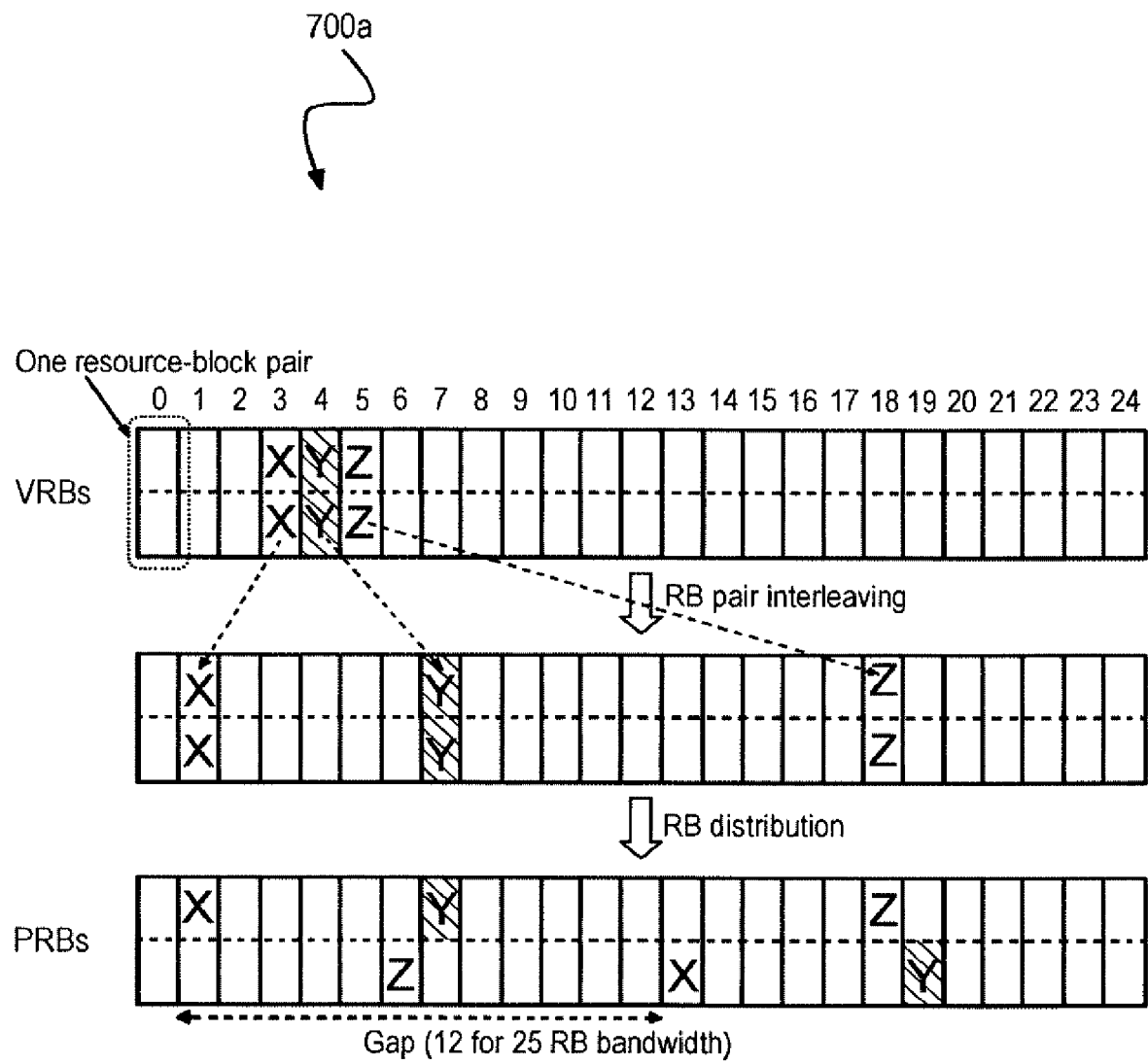
FIG. 7*b* schematically illustrates an exemplary VRB to PRB mapping 700*b* in the case of distributed VRBs.

FIG. 7b schematically illustrates an exemplary VRB to PRB mapping 700b in the case of distributed VRBs.

FIG. 7b illustrates Type 2 Allocation with Distributed Virtual Resource Blocks according to 3GPP naming. In the case of distributed VRBs, the mapping from virtual RBs (that may be still contiguous) to physical RBs (spread, according to a certain algorithm, over all the bandwidth) may be less favorable for the breathing receiver concept.

FIG. 7b illustrates the case where the contiguous VRBs are mapped to non-contiguous PRBs. For example, contiguous VRBs X in resource block pair 3 are mapped after RB interleaving to VRBs X in resource block pair 1; contiguous VRBs Y in resource block pair 4 are mapped after RB interleaving to VRBs Y in resource block pair 7; and contiguous VRBs Z in resource block pair 5 are mapped after RB interleaving to VRBs Z in resource block pair 18. After RB distribution, VRBs X in resource block pair 1 are mapped to non-contiguous PRBs X at resource block pairs 1 and 13; VRBs Y in resource block pair 7 are mapped to non-contiguous PRBs Y at resource block pairs 7 and 19; and VRBs Z in resource block pair 18 are mapped to non-contiguous PRBs Z at resource block pairs 6 and 18.

Figure 8:
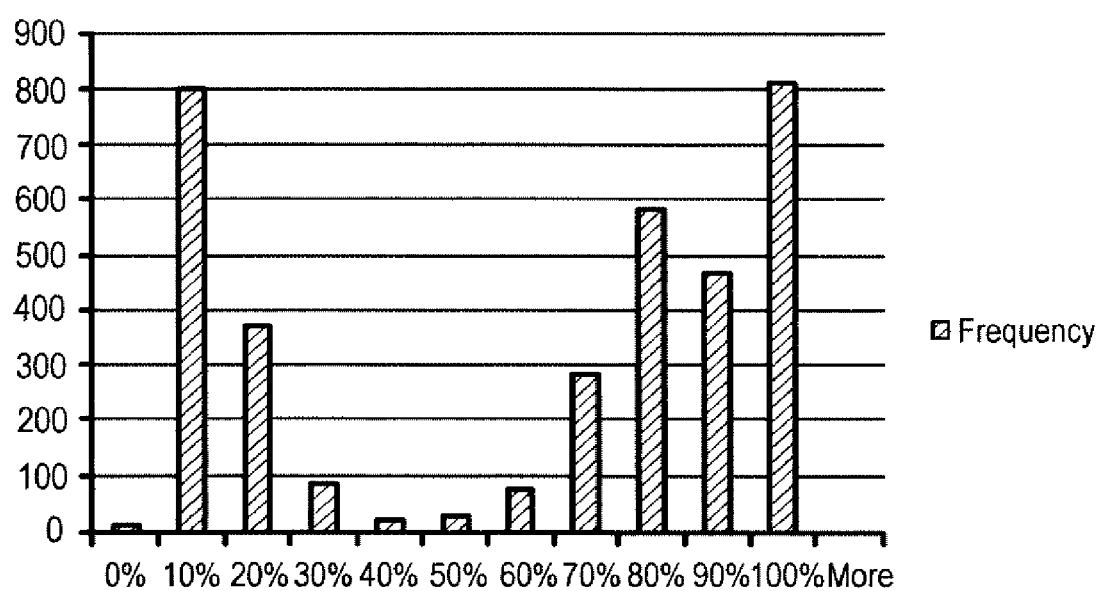
FIG. 8 schematically illustrates an exemplary distribution 800 of average PRB spans.

FIG. 8 schematically illustrates an exemplary distribution 800 of average PRB spans. FIG. 8 is derived from logs for throughput tests.

Almost all of the allocations (~98%) are Type 0 (bitmap). A possible explanation for the experienced distribution is that the full DL allocation is related to DL throughput tests while the low DL allocation (span 10/20%, well suitable to the "breathing") is related to UL throughput tests, where only ACK/NACKs are transmitted on the DL.

This means that, also with Type 0 allocation, the breathing receiver concept maintains its validity in the case of low data rate transmissions in one of the two directions. The breathing receiver benefits from a fast decoding of the control information. The earlier this happens, the earlier the receiving chain can be reconfigured into the reduced power mode. In FIG. 9b, only as an example, it has been assumed that the control information is available at the slot border (half of the frame). A local oscillator capable of fast retuning may be applied to make the breathing receiver fast retuning and thus providing efficient power saving.

FIG. 9a depicts an exemplary LTE resource block pair 900a to illustrate decoding performance of a receiver 400, 200 which completes decoding during reception of symbol 5.

A major challenge of the breathing receiver is the loss of phase information, required for coherent demodulation. The receiver reconfiguration, in fact, changes the behavior of both the analog and the digital components and, subsequently, changes the phase of the received signal.

With special reference to an LTE sub-frame, each resource block (see FIG. 9a) contains cells specific reference symbols R, used for the overall channel estimation. In particular, they occur at symbols 0 and 4 (first slot), 7 and 11 (second slot).

In one example, the retuning may be performed such that the first part of the sub-frame (full bandwidth and before the retuning) is received using reference symbols 0 and 4 for phase estimation; and that the second part of the sub-frame (reduced bandwidth and after the retuning) is received using reference symbols 7 and 11 for phase estimation. This approach follows the paradigm that, as every time the retuning happens, the phase may be lost, the available reference symbols (0, 4, 7, 11) are equally distributed to serve the phase estimation.

In this case it may be mandatory that the decoding is fast enough to have the information available before the slot border. Because, if the decoder is too late and completes after the slot border, the reference symbols placed at symbol 7 cannot be used for the second part of the sub-frame (after the retuning).

FIG. 9b depicts an exemplary LTE resource block pair 900b to illustrate decoding performance of a receiver 200, 400 which completes decoding during reception of symbol 6.

Decoding complete during reception of symbol 6 is the latest point in time possible with this approach, where the old phase is totally discarded and the new one calculated from scratch. Theoretically, the technique can still be applied if the decoding is available before symbol 11 (the last part of the sub-frame would still be catching a reference symbol). Nevertheless, this would have a double drawback in terms of power (very short time spent in power saving mode) and performance (using only one reference symbols for decoding the last part of the sub-frame).

Figure 9D:
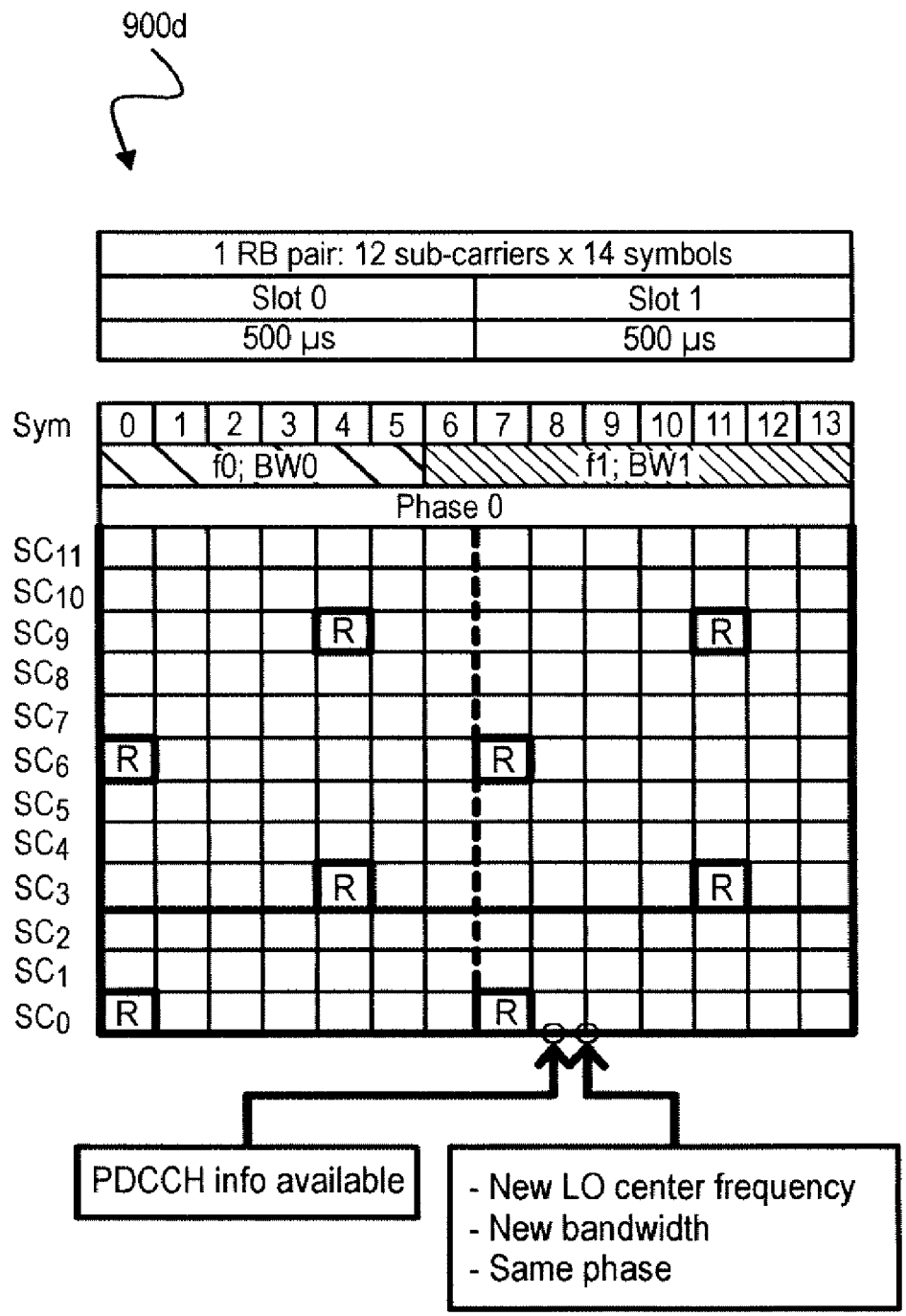
FIG. 9*d* depicts an exemplary LTE resource block pair 900*d* to illustrate slow PDCCH decoding.

FIG. 9c depicts an exemplary LTE resource block pair 900c to illustrate fast PDCCH decoding and FIG. 9d depicts an exemplary LTE resource block pair 900d to illustrate slow PDCCH decoding.

In one example of the breathing receiver as illustrated in FIGS. 9c and 9d the new phase may be estimated and compensated by using prior knowledge about the phase behavior of the analog and digital component throughout the full bandwidth. In such a case there may be no restriction to the switching point between normal and "breathing" mode because, wherever this happen, the phase information is not lost. At the cost of additional complexity for phase estimation and compensation, this may fit a slower receiver according to FIG. 9d and a faster receiver according to FIG. 9c.

Such slower receiver (see FIG. 9d) is not capable of providing the control information before the slot boundary, with switching happening at a late point (less power saving but technique still applicable). The faster receiver (see FIG. 9c) is capable of providing the control information very early. In this case, the switching can be immediate, without the need to keep into account the position of any reference symbol, thus maximizing the power saving.

There might be scenarios where the phase loss or its imperfect compensation produces unacceptable performance degradation (for example at reference sensitivity). For such cases, the breathing functionality can simply be deactivated and enabled only with good link quality (e.g., at high SNR, but moderate data rate).

The effectiveness of the breathing receiver can be greatly increased in the case of "Inter sub-frame" scheduling, meaning that a downlink allocation received at sub-frame N refers to resources granted at sub-frame N+a. This has a double advantage as described in the following. The receiver can always be tuned to the minimum bandwidth because such information is available in advance without the need of "on the fly" decoding. The requirements on processing power can be reduced because more time is allowed for PDCCH decoding (the higher the value of parameter "a", the longer the decoding can take). On the other side, inter sub-frame scheduling increases the latency (the higher the value of "a", the higher the latency) and cannot be suitable for all of the applications.

Figure 10:
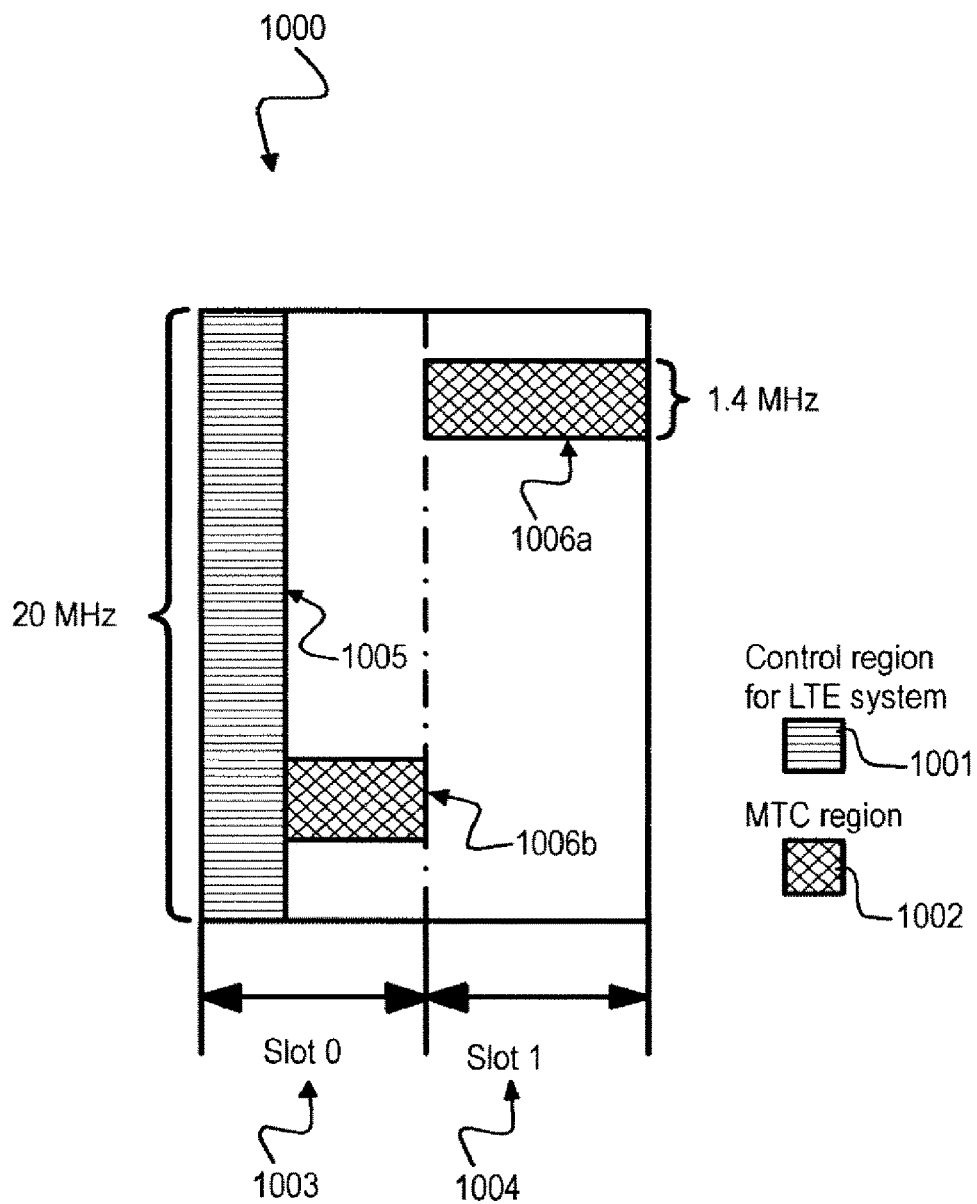
FIG. 10 is a time-frequency grid 1000 of a receiver supporting MTC communication according to the disclosure.

FIG. 10 is a time-frequency grid 1000 of a receiver supporting MTC communication according to the disclosure.

The breathing receiver according to the disclosure can be applied in Machine Type Communications (MTC), e.g. according to the illustration of FIG. 10. Please note that MTC the utilization is not limited to MTC; for example, it may also fit a low rate, non-latency critical application such as messaging like WhatsApp, for example. In this exemplary application a narrow bandwidth (1.4 MHz) system of about 1.4 MHz 1006a, 1006b is operating inside an existing LTE band of about 20 MHz 1005, for example, coexisting with other terminals. In the illustrated frequency grid 1000, a first slot 1003 includes the control region for the LTE system 1001 and a first part 1006b of the 1.4 MHz system and a second slot 1004 succeeding the first slot 1003 includes a second part 1006a of the 1.4 MHz system. With respect to the MTC implementation, the following may apply: The MTC receiver may only work with the 1.4 MHz bandwidth (it is not supposed to receive at higher bandwidth). The 1.4 MHz will hop within the legacy LTE channel. Inter sub-frame allocation can be used. The allocation may be Type 2 with contiguous PRBs and most of the allocation is supposed to be 1 PRB (180 KHz). Therefore the receiver may hop between different center frequency and may receive either at 1.4 MHz or reduced bandwidth once the allocation is known.

The breathing receiver may apply inter-subframe scheduling and contiguous allocation of RB (like LTE Type 2 with localized allocation). Additionally, the breathing receiver may be allowed for frequency hopping between slots, e.g. by implementing a fast re-tunable local oscillator in the breathing receiver, for example according to the description of FIG. 9c.

In one example, the breathing receiver is operating in a single carrier scenario with the reduced bandwidth (1.4 MHz) hopping into one LTE channel. Further enhancements may include frequency hopping within a larger spectrum, fitting operators using carrier aggregation. It is noted that actually only frequency hopping and not the "breathing" is exploited.

This can be achieved by applying inter sub-frame and/or cross-carrier scheduling, e.g. according to the following description. The scheduling may be received at sub-frame N on a carrier, the data may be received at subframe N+k on a different carrier. The control information at sub-frame N may schedule a permanent frequency move at subframe N+k towards a different carrier. This still allows keeping a 1.4 MHz maximum receive bandwidth, but with a "hopping distance" covering extreme sides of the spectrum. In a further example, the breathing receiver may "breathe" between 1.4 MHz and something "less", e.g. 180 kHz.

EXAMPLES

The following examples pertain to further embodiments. Example 1 is a receiver, comprising: a tunable receiving chain, configured to receive a subframe header when tuned to a first receiving bandwidth; a decoder, configured to decode an allocation information from the subframe header, the allocation information indicating an allocation of a plurality of resource blocks in the subframe; and a controller, configured to derive a second receiving bandwidth from the allocation information and to tune the receiving chain to the second receiving bandwidth.

In Example 2, the subject matter of Example 1 can optionally include that the second receiving bandwidth is less than the first receiving bandwidth.

In Example 3, the subject matter of any one of Examples 1-2 can optionally include that a power consumption of the receiving chain tuned to the second receiving bandwidth is less than a power consumption of the receiving chain tuned to the first receiving bandwidth.

In Example 4, the subject matter of any one of Examples 1-3 can optionally include a frequency-tunable local oscillator coupled to the receiving chain, and that the controller is configured to tune the receiving chain to the first receiving bandwidth based on tuning the local oscillator to a first frequency, and to tune the receiving chain to the second receiving bandwidth based on tuning the local oscillator to a second frequency.

In Example 5, the subject matter of Example 4 can optionally include that the first frequency is a center frequency of the first receiving bandwidth, and that the second frequency is a center frequency of the second receiving bandwidth.

In Example 6, the subject matter of any one of Examples 1-5 can optionally include that the tunable receiving chain comprises tunable analog and digital components which are tuned to the first receiving bandwidth for receiving the subframe header; and that the controller is configured to retune the analog and digital components to the second receiving bandwidth after the allocation information has been decoded.

In Example 7, the subject matter of any one of Examples 1-6 can optionally include that the controller is configured to tune the receiving chain to the second receiving bandwidth if a difference between the first receiving bandwidth and the second receiving bandwidth is above a threshold.

In Example 8, the subject matter of any one of Examples 1-7 can optionally include that the each subframe comprises a first slot and a subsequent second slot; and that the decoder is configured to decode the allocation information during the first slot.

In Example 9, the subject matter of Example 8 can optionally include that the controller is configured to retune the receiving chain to the first receiving bandwidth after a slot border of the first subframe has been received by the receiving chain.

In Example 10, the subject matter of any one of Examples 8-9 can optionally include that the controller is configured to tune the receiving chain to the second receiving bandwidth before the slot border of the first subframe has been received by the receiving chain.

In Example 11, the subject matter of Example 10 can optionally include a phase estimator, configured to estimate a phase of the subframe header based on reference symbols of the first slot when the receiving chain is tuned to the first receiving bandwidth and configured to reestimate the phase based on reference symbols of the second slot when the receiving chain is tuned to the second receiving bandwidth.

In Example 12, the subject matter of any one of Examples 8-9 can optionally include that the controller is configured to tune the receiving chain to the second receiving bandwidth during the receiving of the second slot of each subframe by the receiving chain.

In Example 13, the subject matter of Example 12 can optionally include a phase estimator, configured to estimate a phase of the subframe header based on reference symbols of the first subframe when the receiving chain is tuned to the first receiving bandwidth and configured to reestimate the phase based on prior knowledge about a behavior of the phase when the receiving chain is tuned to the second receiving bandwidth.

In Example 14, the subject matter of any one of Examples 1-13 can optionally include that the controller is configured to tune the receiving chain to the second receiving bandwidth responsive to the decoding of the allocation information by the decoder.

In Example 15, the subject matter of any one of Examples 1-8 can optionally include that the controller is configured to tune the receiving chain to the second receiving bandwidth after the subframe header has been received by the receiving chain.

In Example 16, the subject matter of any one of Examples 1-8 and 15 can optionally include that the receiving chain is configured to receive a plurality of subframes following the first subframe; and that the receiver comprises a scheduling circuit, configured to provide inter subframe scheduling information which indicates a scheduling of the plurality of subframes with respect to time; and that the controller is configured to tune the receiving chain to the second receiving bandwidth based on the inter subframe scheduling information.

In Example 17, the subject matter of Example 16 can optionally include that the controller is configured to tune the receiving chain to the second receiving bandwidth after the receiving chain has received a particular subframe of the plurality of subframes, and that the particular subframe is indicated by the inter subframe scheduling information.

In Example 18, the subject matter of any one of Examples 16-17 can optionally include that the scheduling circuit is configured to provide inter subframe cross carrier scheduling information which indicates a scheduling of the plurality of subframes with respect to a plurality of carriers and time, and that the controller is configured to tune the receiving chain to the second receiving bandwidth based on the inter subframe cross carrier scheduling information.

In Example 19, the subject matter of Example 18 can optionally include that the second receiving bandwidth is associated with a particular carrier of the plurality of carriers, that the controller is configured to tune the receiving chain to the second receiving bandwidth of the particular carrier, and that the particular carrier is indicated by the inter subframe cross carrier scheduling information.

Example 20 is a receiver, comprising: a tunable receiving chain, configured to receive a subframe header when tuned to a first receiving bandwidth, wherein the subframe header comprises a physical downlink control channel (PDCCH) comprising an allocation information indicating an allocation of a plurality of physical resource blocks (PRBs) transported by the subframe; a decoder, configured to decode the allocation information from the physical downlink control channel; and a controller, configured to derive a second receiving bandwidth from the allocation information and to tune the receiving chain to the second receiving bandwidth after the allocation information has been decoded.

In Example 21, the subject matter of Example 20 can optionally include that the plurality of physical resource blocks are contiguously distributed within a subframe.

Example 22 is a method for tuning a receiving chain for receiving a subframe header, the method comprising: receiving a subframe header when the receiving chain is tuned to a first receiving bandwidth; decoding an allocation information from the subframe header, the allocation information indicating an allocation of a plurality of resource blocks in the subframe; and deriving a second receiving bandwidth from the allocation information and tuning the receiving chain to the second receiving bandwidth.

In Example 23, the subject matter of Example 22 can optionally include that each subframe comprises a first slot and a subsequent second slot; and that the tuning of the receiving chain to the second receiving bandwidth is finished during the first slot.

In Example 24, the subject matter of any one of Examples 22-23 can optionally include that the second receiving bandwidth is less than the first receiving bandwidth.

Example 25 is a computer readable medium on which computer instructions are stored which when executed by a computer, cause the computer to perform the method of one of Examples 22 to 24.

Example 26 is a mobile receiver system, comprising: a tunable receiving chain circuit, configured to receive a subframe header when tuned to a first receiving bandwidth; a decoder circuit, configured to decode an allocation information from the subframe header, the allocation information indicating an allocation of a plurality of resource blocks in the subframe; and a controller circuit, configured to derive a second receiving bandwidth from the allocation information and to tune the receiving chain to the second receiving bandwidth.

In Example 27, the subject matter of Example 26 can optionally include that the second receiving bandwidth is less than the first receiving bandwidth.

In Example 28, the subject matter of any one of Examples 26-27 can optionally include that a power consumption of the receiving chain circuit tuned to the second receiving bandwidth is less than a power consumption of the receiving chain circuit tuned to the first receiving bandwidth.

In Example 29, the subject matter of any one of Examples 26-28 can optionally include a frequency-tunable local oscillator coupled to the receiving chain circuit, and that the controller circuit is configured to tune the receiving chain circuit to the first receiving bandwidth based on tuning the local oscillator to a first frequency, and to tune the receiving chain circuit to the second receiving bandwidth based on tuning the local oscillator to a second frequency.

In Example 30, the subject matter of Example 29 can optionally include that the first frequency is a center frequency of the first receiving bandwidth, and that the second frequency is a center frequency of the second receiving bandwidth.

In Example 31, the subject matter of any one of Examples 26-30 can optionally include that the system is an on-chip system.

Example 32 is a mobile receiving device with a receiving chain, the mobile receiving device comprising: means for receiving a subframe header when the receiving chain is tuned to a first receiving bandwidth; means for decoding an allocation information from the subframe header, the allocation information indicating an allocation of a plurality of resource blocks in the subframe; and means for deriving a second receiving bandwidth from the allocation information and means for tuning the receiving chain to the second receiving bandwidth.

In Example 33, the subject matter of Example 32 can optionally include that the each subframe comprises a first slot and a subsequent second slot; and that the means for tuning the receiving chain to the second receiving bandwidth is configured to finish tuning of the receiving chain to the second receiving bandwidth during the first slot.

In Example 34, the subject matter of any one of Examples 32-33 can optionally include that the second receiving bandwidth is less than the first receiving bandwidth.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A receiver, comprising:
a tunable receiving chain, configured to receive an allocation information indicating an allocation of a plurality of resource blocks over a first receiving bandwidth; and
a controller, configured to derive a second receiving bandwidth from the allocation information and to tune the receiving chain to the second receiving bandwidth;
wherein the controller is configured to tune the receiving chain to the second receiving bandwidth if a difference between the first receiving bandwidth and the second receiving bandwidth is above a threshold, and not tune the receiving chain to the second receiving bandwidth if the difference between the first receiving bandwidth and the second receiving bandwidth is below the threshold.

2. The receiver of claim 1, wherein the allocation information is received in a downlink control channel.

3. The receiver of claim 1, wherein the allocation information is received via PDCCH.

4. The receiver of claim 1, wherein the allocation information includes information elements including a receiving center frequency, a receiving bandwidth, and a modulation scheme.

5. The receiver of claim 1, wherein the second receiving bandwidth is less than the first receiving bandwidth.

6. The receiver of claim 1,
wherein a power consumption of the receiving chain tuned to the second receiving bandwidth is less than a power consumption of the receiving chain tuned to the first receiving bandwidth.

7. The receiver of claim 1, comprising:
a frequency-tunable local oscillator coupled to the receiving chain, wherein the controller is configured to tune the receiving chain to the first receiving bandwidth based on tuning the local oscillator to a first frequency, and to tune the receiving chain to the second receiving bandwidth based on tuning the local oscillator to a second frequency.

8. The receiver of claim 7,
wherein the first frequency is a center frequency of the first receiving bandwidth, and
wherein the second frequency is a center frequency of the second receiving bandwidth.

9. The receiver of claim 1,
wherein the tunable receiving chain comprises tunable analog and digital components which are tuned to the first receiving bandwidth for receiving the allocation information; and
wherein the controller is configured to retune the analog and digital components to the second receiving bandwidth after deriving the second receiving bandwidth.

10. The receiver of claim 1,
wherein the allocation information is decoded when the tunable receiving chain is tuned to the first receiving bandwidth.

11. The receiver of claim 1,
wherein the controller is configured to tune the receiving chain to the second receiving bandwidth responsive to decoding the allocation information by a decoder.

12. The receiver of claim 1,
wherein the controller is configured to tune the receiving chain to the second receiving bandwidth after the allocation information has been received by the receiving chain.

13. The receiver of claim 1,
wherein the receiver comprises a scheduling circuit configured to provide inter subframe cross carrier scheduling information which indicates a scheduling of a plurality of subframes following a first subframe of the allocation information with respect to a plurality of carriers and time,
wherein the second receiving bandwidth is associated with a particular carrier of the plurality of carriers,
wherein the controller is configured to tune the receiving chain to the second receiving bandwidth of the particular carrier,
wherein the particular carrier is indicated by the inter subframe cross carrier scheduling information.

14. A receiver, comprising:
a tunable receiving chain, configured to receive an allocation information over a first receiving bandwidth, the allocation information indicating an allocation of a plurality of resource blocks via a downlink control channel;
a controller, configured to derive a second receiving bandwidth from the allocation information and to tune the receiving chain to the second receiving bandwidth; and
a phase estimator, configured to estimate a phase of the allocation information based on reference symbols of a first slot when the receiving chain is tuned to the first receiving bandwidth and configured to reestimate the phase based on reference symbols of a second slot when the receiving chain is tuned to the second receiving bandwidth.

15. The receiver of claim 14,
wherein the controller is configured to tune the receiving chain to the second receiving bandwidth during the receiving of the second slot by the receiving chain.

16. The receiver of claim 15, wherein the phase estimator is configured to reestimate the phase based on prior knowledge about a behavior of the phase when the receiving chain is tuned to the second receiving bandwidth.

17. A receiver, comprising:
a tunable receiving chain, configured to receive an allocation information over a first receiving bandwidth indicating an allocation of a plurality of resource blocks in a first subframe; and
a controller, configured to derive a second receiving bandwidth from the allocation information and to tune the receiving chain to the second receiving bandwidth;
wherein the receiving chain is configured to receive a plurality of subframes following the first subframe;
wherein the controller is configured to tune the receiving chain to the second receiving bandwidth based on an inter subframe scheduling information which indicates a scheduling of the plurality of subframes,
wherein the controller is configured to tune the receiving chain to the second receiving bandwidth if a difference between the first receiving bandwidth and the second receiving bandwidth is above a threshold.

18. The receiver of claim 17, wherein the controller is configured to tune the receiving chain to the second receiving bandwidth after the receiving chain has received a particular subframe of the plurality of subframes, wherein the particular subframe is indicated by the inter subframe scheduling information.

* * * * *